United States Patent
Koda

(10) Patent No.: US 10,350,932 B2
(45) Date of Patent: Jul. 16, 2019

(54) DISPLAY AND DISPLAY OBSERVATION METHOD

(71) Applicant: TOPPAN PRINTING CO., LTD., Taito-ku, Tokyo (JP)

(72) Inventor: Soko Koda, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/665,784

(22) Filed: Aug. 1, 2017

(65) Prior Publication Data
US 2017/0326898 A1    Nov. 16, 2017

Related U.S. Application Data

(63) Continuation of application No. PCT/JP2016/053297, filed on Feb. 4, 2016.

(30) Foreign Application Priority Data

Feb. 4, 2015 (JP) .................................. 2015-020463
Jun. 23, 2015 (JP) .................................. 2015-125614

(51) Int. Cl.
*B42D 25/328*        (2014.01)
*B42D 25/324*        (2014.01)
(Continued)

(52) U.S. Cl.
CPC ........... *B42D 25/328* (2014.10); *B42D 25/23* (2014.10); *B42D 25/29* (2014.10); *B42D 25/324* (2014.10);
(Continued)

(58) Field of Classification Search
CPC .... B42D 25/387; B42D 25/373; B42D 25/36; B42D 25/346; B42D 25/324; B42D 25/29;
(Continued)

(56) References Cited

U.S. PATENT DOCUMENTS

2010/0307705 A1*  12/2010  Rahm ................... B42D 25/29
                                                          162/140
2014/0285892 A1*  9/2014  Sauvage-Vincent ........................
                                                          G02B 5/008
                                                          359/572
(Continued)

FOREIGN PATENT DOCUMENTS

JP        2000-501036 A      2/2000
JP        2012-223905 A     11/2012
(Continued)

OTHER PUBLICATIONS

International Preliminary Report on Patentability dated Aug. 8, 2017, in International Patent Application No. PCT/JP2016/053297, 10 pages.

(Continued)

*Primary Examiner* — David R Dunn
*Assistant Examiner* — Christopher E Veraa
(74) *Attorney, Agent, or Firm* — Squire Patton Boggs (US) LLP

(57) ABSTRACT

A display body includes a first surface, a second surface, a first optical component, and a second optical component. The first surface includes a first optical surface and a second optical surface. First light is incident on the first surface from an observation side. The second surface is located opposite to the observation side with respect to the first surface. Second light is incident on the second surface from a side opposite to the observation side with respect to the second surface. The first optical component forms first information, which is displayed on the observation side, from the first light received on the first optical surface. The second optical component receives the second light transmitted through the second surface, forms second information, which is displayed on the observation side, from the (Continued)

second light, and emits the second information from the second optical surface.

15 Claims, 11 Drawing Sheets

(51) Int. Cl.
  *B42D 25/387*    (2014.01)
  *G02B 5/20*      (2006.01)
  *B42D 25/36*     (2014.01)
  *B42D 25/23*     (2014.01)
  *B42D 25/29*     (2014.01)
  *B42D 25/346*    (2014.01)
  *B42D 25/373*    (2014.01)
  *G02B 5/18*      (2006.01)
  *G09F 19/14*     (2006.01)

(52) U.S. Cl.
  CPC ......... *B42D 25/346* (2014.10); *B42D 25/36* (2014.10); *B42D 25/373* (2014.10); *B42D 25/387* (2014.10); *G02B 5/20* (2013.01); *G02B 5/18* (2013.01); *G09F 19/14* (2013.01)

(58) Field of Classification Search
  CPC ........ B42D 25/23; B42D 25/328; G02B 5/20; G02B 5/18; G09F 19/14
  See application file for complete search history.

(56) References Cited

U.S. PATENT DOCUMENTS

| | | | | |
|---|---|---|---|---|
| 2015/0219807 A1* | 8/2015 | Lochbihler | .......... | G02B 5/1809 359/567 |
| 2015/0298482 A1* | 10/2015 | Walter | .................. | G02B 5/008 359/572 |
| 2015/0362642 A1* | 12/2015 | Nagano | .................... | G02B 5/02 283/72 |
| 2016/0200133 A1* | 7/2016 | Aigner | .................... | B32B 15/08 283/85 |
| 2017/0225502 A1* | 8/2017 | Sauvage-Vincent | ......... | B42D 25/328 |

FOREIGN PATENT DOCUMENTS

| | | |
|---|---|---|
| JP | 2013-174683 A | 9/2013 |
| JP | 2014-219546 A | 11/2014 |
| WO | WO 2014/072358 A | 5/2014 |

OTHER PUBLICATIONS

International Search Report dated May 17, 2016 in International Patent Application No. PCT/JP2016/053297, 2 pages.

\* cited by examiner

DISPLAY AND DISPLAY OBSERVATION METHOD

BACKGROUND

The present disclosure relates to a display body that displays a plurality of pieces of information and a method for observing the display body.

Objects such as securities, certificates, brand-name products, high-price products, electronic devices, and identifications should be counterfeit-resistant to protect their values and information from others. To this end, a counterfeit-resistant display body or display section may be attached to or integrated into such objects.

An example of an object including a counterfeit-resistant display section is a banknote having a paper carrier and motifs printed on the surface of the carrier. A plurality of minute holes extends through the carrier. In reflected light observation of this banknote, the image information formed by the motifs on the banknote is visible, while the image information formed by the minute holes is invisible. In transmitted light observation, however, the image information formed by the minute holes is visible (see Japanese Laid-Open Patent Publication No. 2000-501036, for example).

The motifs of the banknote are two-dimensional print on the surface of the carrier, while the minute holes are three-dimensional structures extending through the entire thickness of the carrier. Two-dimensional print like the motifs and three-dimensional structures like the minute holes are formed on or in the carrier in different steps. Typically, the motifs and the holes are positioned relative to the carrier at different times with different methods due to their differences in the dimensions and the techniques of processing. This may result in the positions of motifs relative to the holes shifted from the predetermined positions or varied among banknotes.

Such a problem is not limited to a display body that limits counterfeiting of an object and may occur in a display body for decorating an object and a display body that is observed for its own quality.

SUMMARY

It is an objective of the present disclosure to provide a display body that displays a plurality of pieces of information in accurate positional relationship, and a method for observing the display body.

To achieve the foregoing objective and in accordance with one aspect of the present disclosure, a display body is provided that includes a first surface, a second surface, a first optical component, and a second optical component. The first surface includes a first optical surface and a second optical surface. First light is incident on the first surface from an observation side. The second surface is located opposite to the observation side with respect to the first surface. Second light is incident on the second surface from a side opposite to the observation side with respect to the second surface. The first optical component includes the first optical surface. The first optical component forms first information, which is displayed on the observation side, from the first light received on the first optical surface. The second optical component includes the second optical surface. The second optical component receives the second light transmitted through the second surface, forms second information, which is displayed on the observation side, from the second light, and emits the second information from the second optical surface. The second optical component is an uneven structure. The uneven structure includes an uneven structure portion including a dielectric that transmits light, and a metal layer covering at least a part of the uneven structure portion. A surface of the metal layer that is opposite to an interface between the uneven structure portion and the metal layer is the second optical surface. The uneven structure includes a plasmon structure that receives the second light on the interface and excites surface plasmons on the metal layer so that the second optical surface emits transmitted light that forms the second information and differs from the second light in color.

To achieve the foregoing objective and in accordance with another aspect of the present disclosure, a method for observing a display body is provided. The display body includes a first surface, a second surface, a first optical component, and a second optical component. The first surface includes a first optical surface and a second optical surface. First light is incident on the first surface from an observation side. The second surface is located opposite to the observation side with respect to the first surface. Second light is incident on the second surface from a side opposite to the observation side with respect to the second surface. The first optical component includes the first optical surface. The first optical component forms first information, which is displayed on the observation side, from the first light received on the first optical surface. The second optical component includes the second optical surface. The second optical component receives the second light transmitted through the second surface, forms second information, which is displayed on the observation side, from the second light, and emits the second information from the second optical surface. The second optical component is an uneven structure. The uneven structure includes an uneven structure portion including a dielectric that transmits light, and a metal layer covering at least a part of the uneven structure portion. A surface of the metal layer that is opposite to an interface between the uneven structure portion and the metal layer is the second optical surface. The uneven structure includes a plasmon structure that receives the second light on the interface and excites surface plasmons on the metal layer so that the second optical surface emits transmitted light that forms the second information and differs from the second light in color. The method includes: causing the first light to be incident on the first surface; observing the first information formed by the first optical component from the first light incident on the first surface; causing the second light to be incident on the second surface; and observing the second information formed by the second optical component from the second light incident on the second surface.

Since both of the first optical component and the second optical component include parts of the first surface as optical surfaces, the first optical component and the second optical component may be positioned relative to each other by a common method. Alternatively, the first optical component and the second optical component may be formed using the same type of technique.

For example, the shape of an original plate including a die for shaping the first optical component and a die for shaping the second optical component may be transferred to a substrate, or a substrate may be etched using a single mask that includes a mask for forming the first optical component and a mask for forming the second optical component.

Alternatively, the shape of an original plate for forming the first optical component may be transferred to a substrate, and then the shape of an original plate for forming the second optical component may be transferred to the substrate, or a substrate may be etched using a mask for forming the first optical component and then etched using a mask for forming the second optical component.

Such a method increases the accuracy of the position of the second optical component relative to the first optical component and thus the accuracy of the display position of the second information relative to the display position of the first information.

DESCRIPTION OF EXEMPLARY EMBODIMENTS

Referring to FIGS. 1 to 14, one embodiment of a display body and a method for observing the display body according to the present disclosure is now described. In the following descriptions, the overall structure of the display body, the structure of the optical components of the display body, the structures of the front surface of the display body, and the method for observing the display body are described in this order.

[Overall Structure of Display Body]

Figure 1:
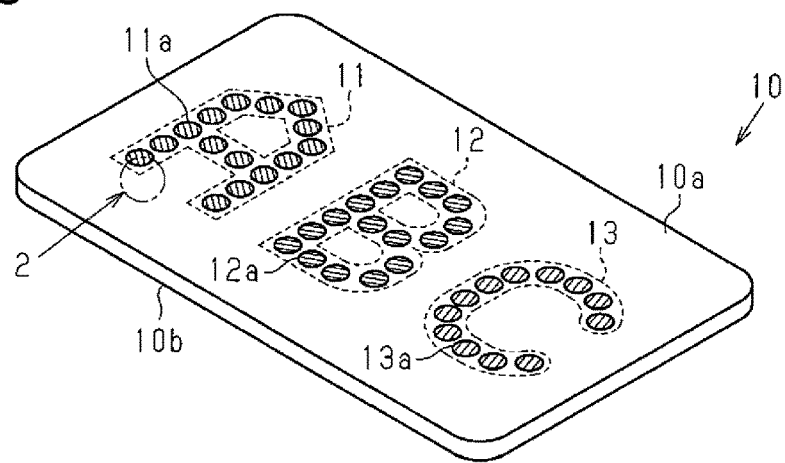
FIG. 1 is a perspective view showing the perspective structure of a display body according to one embodiment of the present disclosure.
Figure 2:
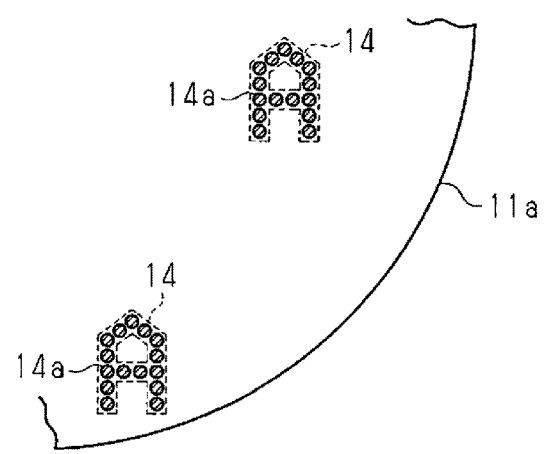
FIG. 2 is a partial enlarged view of a region 2 in FIG. 1, which is a part of the display body.

Referring to FIGS. 1 and 2, the overall structure of a display body is now described. FIG. 2 is an enlarged view of a part of the display body shown in FIG. 1.

As shown in FIG. 1, a display body 10 has the shape of a rectangular plate and includes a front surface 10a, which is an example of the first surface. The front surface 10a of the display body 10 is a surface on which first light is incident. The side from which the first light is incident on the front surface 10a is an observation side. The display body 10 includes a back surface 10b, which is an example of the second surface located opposite to the observation side with respect to the front surface 10a. Second light is incident on the back surface 10b from the side opposite to the observation side with respect to the back surface 10b.

The display body 10 may have the shape of a circular plate or a rectangular solid, instead of a rectangular plate.

The display body 10 includes a plurality of optical components including first optical components and second optical components. Each first optical component includes a part of the front surface 10a that functions as a first optical surface for providing optical effects. That is, the first optical component includes the first optical surface. The first optical component forms first information from the first light received on the first optical surface. The first information is displayed on the observation side.

The display body 10 includes a first component 11 and a second component 12 as examples of first optical components, but the display body 10 may include only one first optical component or three or more first optical components.

The first component 11 includes a plurality of first display elements 11a defined inside the first component 11. Each first display element 11a is a circular structure in a plan view. The first display elements 11a are arranged at predetermined intervals in the first component 11. The second component 12 includes a plurality of second display elements 12a defined inside the second component 12. Each second display element 12a is a circular structure in a plan view. The second display elements 12a are arranged at predetermined intervals in the second component 12.

Each of the first and second display elements 11a and 12a may be a structure having a polygonal shape, such as a triangular or tetragonal shape, instead of a circular shape. In addition, display elements may be arranged in contact with one another in each component.

The first component 11 and the second component 12 form different pieces of information. The first component 11 forms the letter A as first information, and the second component 12 forms the letter B as first information.

The first and second components 11 and 12 may form the same information. The first information is not limited to a letter, such as the letter A or B, and may be a symbol, a number, a graphic, such as an illustration or a pattern, and a combination of two or more letters, symbols, numbers, and graphics.

Each second optical component includes a part of the front surface 10a that functions as a second optical surface for providing optical effects. That is, the second optical component includes the second optical surface. The second optical component receives the second light transmitted through the back surface 10b, forms second information displayed on the observation side from the second light, and emits the second information from the second optical surface.

The display body 10 includes a third component 13, which functions as a second optical component and is located in the front surface 10a independent of the first and second components 11 and 12. The third component 13 includes a plurality of third display elements 13a defined inside the third component 13. Each third display element 13a is a circular structure in a plan view. The third display elements 13a are arranged at predetermined intervals in the third component 13.

The third display element 13a may be a structure having a polygonal shape, such as a triangular or tetragonal shape, instead of a circular shape. In addition, third display elements 13a may be arranged in contact with one another in the third component 13.

The third component 13 forms the letter C as second information. However, the second information is not limited to a letter, such as the letter C, and may be a symbol, a number, a graphic, such as an illustration and a pattern, and a combination of two or more letters, symbols, numbers, and graphics. In addition, the second information formed by the third component 13 is not limited to a letter, a symbol, a number, or a graphic and may be color information, such as the proportion of an area having a certain color in the third component 13, coloration of the third component 13, or presence or absence of a color, and positional information, such as the position of a certain color or the position of a section of the third component 13 that has a color.

As shown in FIG. 2, the display body 10 includes a plurality of fourth components 14, which function as second optical components. Each fourth component 14 is surrounded by a first display element 11a. Each fourth component 14 includes a plurality of fourth display elements 14a defined inside the fourth component 14. Each fourth display element 14a is a circular structure in a plan view. The fourth display elements 14a are arranged at predetermined intervals in the fourth component 14.

Each fourth component 14 forms the letter A as second information. The information formed by the fourth component 14 differs from the information formed by the second component 12 and the information formed by the third component 13. Alternatively, the information formed by the fourth component 14 may be the same as the information formed by the second component 12 or the information formed by the third component 13 but differ from the information formed by the first component 11.

In the front surface 10a of the display body 10, when the area occupied by the first component 11 is S1 and the area occupied by the fourth component 14 is S2, the relationship between the areas S1 and S2 satisfies Expression (1) below.

$$0.01 \leq S2/S1 \leq 0.4 \qquad \text{(Expression 1)}$$

When Expression (1) is satisfied, the size of the fourth component 14 relative to the size of the first component 11 is small enough so that the fourth component 14 surrounded by the first component 11 is likely to be indiscernible when reflection light from the front surface 10a of the display body 10 is observed as the effect of the first component 11.

The area S1 is preferably between 0.16 mm$^2$ and 1 mm$^2$, inclusive, for example, and the area S2 is preferably between 100 μm$^2$ and 90,000 μm$^2$, inclusive. The area S1 is preferably large enough to be discernible to the observer with the naked eye, while the area S2 is preferably small enough to be indiscernible to the observer with the naked eye.

The display body 10 may include two or more second optical components that are independent of the first optical components in the display body 10, like the third component 13 described above, or may include only one second optical component surrounded by a first optical component, like the fourth component 14 described above. The display body 10 may include only one of a second optical component that is independent of a first optical component in the display body 10 and a second optical component surrounded by a first optical component.

[Structure of Optical Component]

Referring to FIGS. 3 to 9, the structures of the optical components of the display body 10 are now described in detail. The structure of a second optical component is described referring to FIGS. 3 and 4, and the structures of first optical component are described referring to FIGS. 5 to 9. For the sake of the convenience of explanation, the metal layer of the second optical component is omitted in FIG. 4.

The third component 13 and the fourth components 14, which are second optical components, differ from each other in the positions in the display body 10 but have the same structure as optical components. Thus, the structure of the third component 13 is described, and the structure of the fourth component 14 is not described. In addition, the first component 11 and the second component 12, which are first optical components, differ from each other in the positions in the display body 10 but have the same structure as optical components. Thus, the structure of the first component 11 is described, and the structure of the second component 12 is not described.

Figure 3:
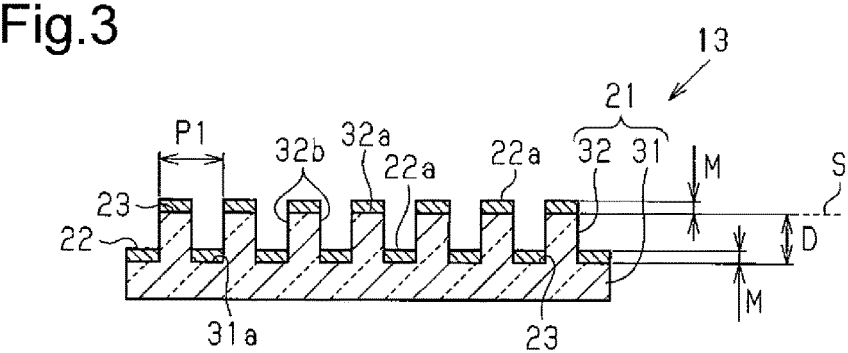
FIG. 3 is an enlarged cross-sectional view showing a part of the cross-sectional structure of a third component.

As shown in FIG. 3, the third component 13, which is an example of the second uneven structure, includes an uneven structure portion 21 and a metal layer 22 partially covering the uneven structure portion 21. The uneven structure portion 21 is made of a light-transmitting dielectric. The third component 13 includes a plasmon structure, which includes an interface 23 between the uneven structure portion 21 and the metal layer 22. The plasmon structure receives the second light on the interface 23 and excites surface plasmons on the metal layer 22, thereby absorbing light of certain wavelengths in the second light and converts the light into transmitted light that differs from the second light in color.

The uneven structure portion 21 includes a plate portion 31, which has a base surface 31a serving as one surface, and a plurality of protrusions 32, which projects from the base surface 31a. The base surface 31a is an example of the second base surface, and the plate portion 31 is an example of the second plate portion. The protrusions 32 are examples of the second protrusions. Each protrusion 32 includes a top surface 32a, which is spaced apart from the base surface 31a, and two side surfaces 32b connected to the base surface 31a. The top surfaces 32a are in a single imaginary plane S, which is substantially parallel with the base surface 31a. The distance D between the base surface 31a and the imaginary plane S is preferably between 30 nm and 500 nm, inclusive.

Each protrusion 32 has the shape of a rectangular prism, but the protrusion 32 may have the shape of other polygonal prism, such as a triangular prism or a pentagonal prism, a cylinder, an elliptical prism, a cone, or a pyramid. When the protrusion 32 has the shape of a polygonal prism, each corner of the polygonal prism may have a curvature. Further, each protrusion 32 may include a plurality of steps in the side surfaces 32b connecting the top surface 32a to the base surface 31a. When the protrusion 32 has steps in the side surfaces 32b and is shaped so that the dimensions in the width direction increase in steps from the top surface 32a to the base surface 31a, the metal layer 22 may be formed on each of the surfaces in the side surfaces 32b that are substantially parallel with the imaginary plane S.

The metal layer 22 is formed on the top surfaces 32a of the protrusions 32 and the entire section of the base surface 31a that is free of the protrusions 32. In the third component 13, the side surfaces 32b of the protrusions 32, the front surface 22a of the metal layer 22 formed on the base surface 31a, and the front surface 22a of the metal layer 22 formed on the top surface 32a of each protrusion 32 form a part of the front surface 10a of the display body 10. The front surface 22a of the metal layer 22 of the third component 13 forms the second optical surface.

The metal layer 22 may be formed only on the base surface 31a or only on the top surfaces 32a. Alternatively, the metal layer 22 may be formed on a part of the base surface 31a or only on some of the top surfaces 32a.

For example, the metal layer 22 has a predetermined thickness M of between 20 nm and 100 nm, inclusive, preferably between 40 nm and 60 nm, inclusive. When the thickness M of the metal layer 22 is greater than or equal to 40 nm, the difference between the transmittance of the first optical component and the transmittance of the second optical component will be more noticeable. The thickness M of the metal layer 22 that is less than or equal to 60 nm allows the metal layer 22 to resist cracks.

The metal layer 22 preferably includes a material of which the real part of the complex dielectric constant is negative over the ultraviolet to visible light range and thus has a high reflectivity. Suitable materials for the metal layer 22 include aluminum, gold, silver, and titanium nitride. Aluminum and silver, which have high reflectivity, are particularly suitable for the metal layer 22. Of the possible materials for the metal layer 22, silver has the highest reflectivity, and aluminum is less expensive. When the complex dielectric constant of the material forming the metal layer 22 is as described above, the light transmitted by excitation of surface plasmons is in the visible light range. This allows the observer to recognize the second information emitted by the display body 10.

The metal layer 22 may be formed by physical vapor deposition, such as vacuum deposition or sputtering. The metal layer 22 that is formed by vacuum deposition includes a minute uneven structure in the front surface 22a of the metal layer 22. However, such a minute uneven structure formed by vacuum deposition is not large enough to affect excitation of surface plasmons. Thus, the uneven structure formed by vacuum deposition, or surface roughness, in the metal layer 22 is acceptable.

The third component 13 may include a protective layer, which transmits light and covers the metal layer 22. The protective layer limits breaking of the minute uneven structures of the third component 13. In addition, the protective layer allows at least one of the selection of wavelengths that cause surface plasmon resonances, or the selection of wavelength width, and the light absorption amount to differ from those of a structure that does not include a protective layer.

The protective layer may be made of a light-transmitting plastic or a dielectric material. The examples of plastic that may be used for the protective layer include polyethylene, polypropylene, polytetrafluoroethylene, polymethyl methacrylate, and polystyrene.

The examples of a dielectric material that may be used for the protective layer include $Sb_2O_3$, $Fe_2O_3$, $TiO_2$, CdS, $CeO_2$, ZnS, $PbCl_2$, CdO, $WO_3$, SiO, $Si_2O_3$, $In_2O_3$, PbO, $Ta_2O_3$, ZnO, $ZrO_2$, MgO, $Si_2O_2$, $MgF_2$, $CeF_3$, $CaF_2$, $AlF_3$, $Al_2O_3$, and GaO.

When the protective layer is made of a plastic, colorants may be added to the plastic. Depending on the wavelengths the colorant absorbs, the protective layer allows at least one of the selection of wavelengths that cause surface plasmon resonances, or the selection of wavelength width, and the light absorption amount to differ from those of a structure that does not include a protective layer. In addition, changing the colorant in the protective layer to another colorant changes at least one of the selection of wavelengths that cause surface plasmon resonances, or the selection of wavelength width, and the light absorption amount, depending on the difference between the wavelengths absorbed by the colorants.

Figure 4:
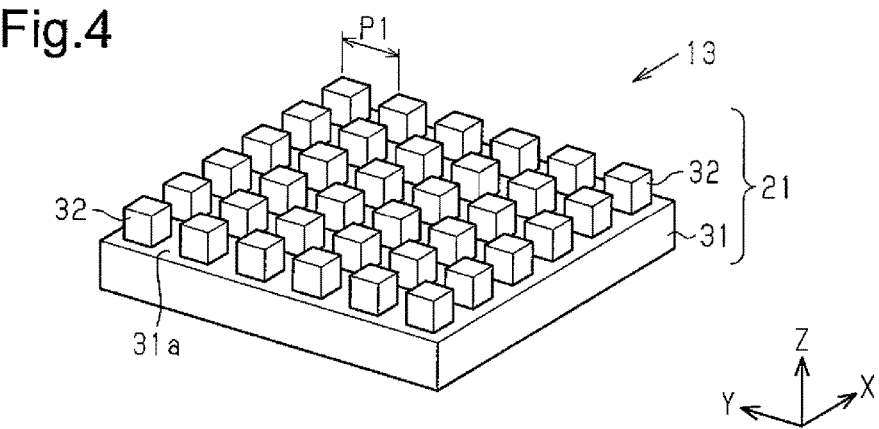
FIG. 4 is a partial perspective view showing a part of the structure of the third component.

As shown in FIG. 4, the protrusions 32 on the base surface 31a of the plate portion 31 are arranged at regular intervals in the X direction, which is one direction, and also arranged at regular intervals in the Y direction, which is perpendicular to the X direction. The interval between two protrusions 32 in the X direction is the same as that in the Y direction. In other words, the protrusions 32 are arranged in a square lattice pattern on the base surface 31a. The pitch P1, which is the interval between two protrusions 32 in the X direction, is preferably between 100 nm and 600 nm, inclusive, for example.

The height of the protrusions 32 is preferably between 50 nm and 600 nm, inclusive. When the height of the protrusions 32 is greater than or equal to 50 nm, surface plasmons are more likely to absorb certain wavelengths of the incident light and convert the incident light into transmitted light that differs from the incident light in color. The height of the protrusions 32 that is less than or equal to 600 nm facilitates formation of the protrusions 32.

In order for each third display element 13a forming the third component 13 to emit transmitted light of a predetermined color, the plasmon structure of the third display element 13a preferably includes two or more protrusions 32 and a metal layer 22 that covers at least the top surface 32a of each protrusion 32.

The protrusions 32 may be arranged in a triangular lattice pattern or a hexagonal lattice pattern on the base surface 31a. The protrusions 32 that are arranged in a triangle or hexagonal lattice pattern differ from the protrusions 32 that are arranged in a square lattice pattern in the number of pitches P1. Different arrangements of the protrusions 32 result in different states of the surface plasmon excitation on the metal layer 22.

When the protrusions 32 are arranged in a hexagonal lattice pattern, a protrusion 32 is spaced apart from the six protrusions 32 surrounding that protrusion 32 by the same distance. That is, all of the protrusions 32 are arranged such that adjacent ones of the protrusions 32 are located at regular intervals, that is, at the same pitch P1. The protrusions 32 that are arranged in a hexagonal lattice pattern are all arranged at regular intervals, resulting in substantially the same surface plasmon state over the metal layer 22. This facilitates adjustment of the color of the light transmitted through each third display element 13a as compared with a structure in which the protrusions 32 are arranged in a square lattice pattern.

Provided that the material of the uneven structure portion 21 and the pitch P1 of the protrusions 32 remain unchanged, a change in the fill factor, which is the ratio of the dimension of the protrusions 32 in the X or Y direction to the pitch P1, changes the color of light emitted by the plasmon structure.

The uneven structure portion 21 may be made of quartz, for example. The uneven structure portion 21 may be made of other inorganic materials that transmit visible light, such as titanium oxides or magnesium fluoride, or organic materials that transmit visible light, such as acrylic resins including urethane-modified acrylic resin and epoxy-modified acrylic resin, epoxy resins, and other resins.

When the uneven structure portion 21, which includes the plate portion 31 and the protrusions 32, is made of an inorganic material, the uneven structure portion 21 may be formed by chemically or physically etching a substrate of the inorganic material. When the uneven structure portion 21 is made of a resin, the plate portion 31 and the protrusions 32 may be formed by transferring the shape of an original plate to the resin before hardening.

Each third display element 13a in the third component 13 includes the interface 23 between the uneven structure portion 21 and the metal layer 22. The surface plasmons excited on the metal layer 22 allow the third display element 13a to emit light that differs from the irradiated light in color. All third display elements 13a emit light of the same color. The third display elements 13a display second information by emitting the light having a predetermined color resulting from the surface plasmon excitation. The light of the predetermined color within the light emitted by the display body 10 allows the observer of the display body 10 to recognize the second information.

Referring to FIGS. 5 to 9, five different examples of the structure of the first component 11 are now described.

Figure 5:
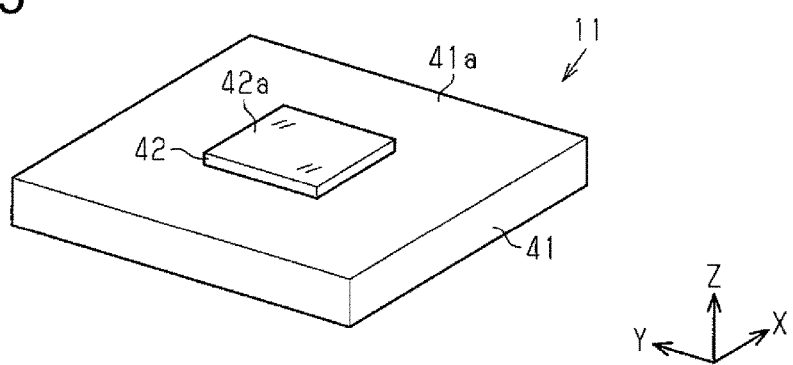
FIG. 5 is a partial perspective view showing a part of the perspective structure of an example of a first component.

The first component 11 shown in FIG. 5 is an example of the first uneven structure. The first component 11 may include a plate portion 41, which is shaped like a plate and made of a dielectric, and a metal layer 42 formed on a base surface 41a, which is one surface of the plate portion 41. The plate portion 41 is an example of the first plate portion. The first component 11 is an uneven structure having unevenness resulting from the step between the plate portion 41 and the metal layer 42. The front surface 42a of the metal layer 42 and the section of the base surface 41a that is free of the metal layer 42 form a part of the front surface 10a of the display body 10.

In this first component 11, the front surface 42a of the metal layer 42 functions as a reflection surface, which is an example of the first optical surface. The first component 11 forms first information, which is displayed on the observation side, by reflecting the first light received on the front surface 42a of the metal layer 42.

Figure 6:
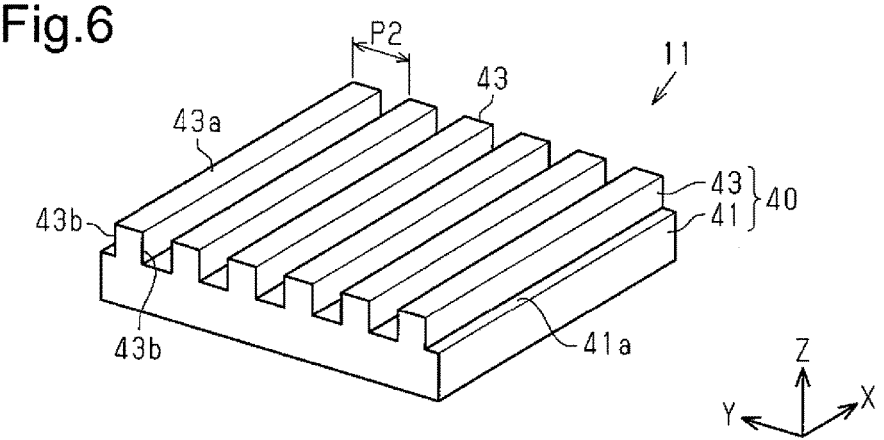
FIG. 6 is a partial perspective view showing a part of the perspective structure of an example of a first component.

As shown in FIG. 6, the first component 11 may be an uneven structure including a plate portion 41 and a plurality of protrusions 43 projecting from the base surface 41a. The plate portion 41 is an example of the first plate portion, and the base surface 41a is an example of the first base surface.

The protrusions 43 are examples of the first protrusions. In this first component 11, the plate portion 41 and the protrusions 43 form an uneven structure portion 40. Each protrusion 43 is shaped like a rectangular prism extending in the X direction. The protrusions 43 are arranged at regular intervals in the Y direction at a predetermined pitch P2. The first component 11 has the shape of a square wave in cross-section in the Z direction, which is parallel with the thickness direction of the display body 10. The first component 11 is a laminar grating.

In this first component 11, the surface of each protrusion 43, which is a top surface 43a spaced apart from the base surface 41a, two side surfaces 43b of each protrusion 43, which are connected to the base surface 41a, and the section of the base surface 41a that is free of the protrusions 43 form a part of the front surface 10a of the display body 10. In this first component 11, a plurality of top surfaces 43a functions as a diffraction surface, which is an example of the first optical surface, and the first component 11 forms first information on the observation side by diffracting the first light received on the top surfaces 43a.

Figure 7:
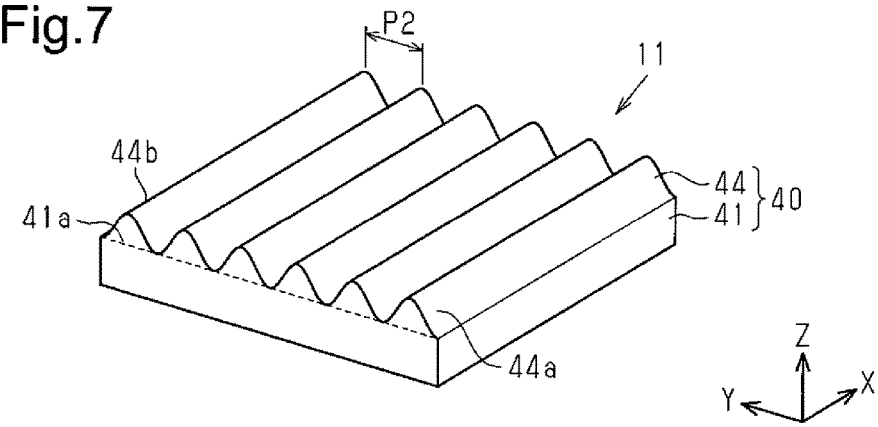
FIG. 7 is a partial perspective view showing a part of the perspective structure of an example of a first component.

As shown in FIG. 7, when the first component 11 is a reflective diffraction grating, the first component 11 may have a sinusoidal cross-section in the Z direction. That is, each protrusion 44 extends in the X direction and substantially has the shape of a triangular prism having curved side surfaces 44a extending in the X direction. The protrusions 44 are arranged in the Y direction at a pitch P2.

In this first component 11, the surfaces of the protrusions 44 form a part of the front surface 10a of the display body 10 and function as a diffraction surface, which is an example of the first optical surface. The surfaces of the protrusions 44 are side surfaces 44a on opposite sides of each of the tops 44b, which are located successively in the Y direction.

When the first component 11 is a reflective diffraction grating, the first component 11 may have a sawtooth-shaped cross-section in the Z direction. That is, the first component 11 may be a blazed grating. Further, when the first component 11 is a reflective diffraction grating, the protrusions of the first component 11 may each have the shape of a polygonal prism other than the triangular or rectangular prism described above.

The first component 11 may include multiple diffraction gratings having different cross-sectional shapes in the Z direction. Such diffraction gratings differ from each other in the intensity of diffraction light, forming first information using the multiple intensities of diffraction light beams. The cross-section in the Z direction of the first component 11 may be shaped such that interference occurs between two light beams diffracted by the first component 11. Such a first component 11 forms first information using the interference fringes caused by the light interference. Further, the first component 11 may include multiple diffraction gratings having different cross-sectional shapes in the Z direction and form first information using the multiple intensities of diffraction light beams and the light interference.

When the first component 11 is a reflective diffraction grating, the pitch P2 is preferably between 200 nm and 2,000 nm, inclusive, more preferably between 500 nm and 1,000 nm, inclusive. The pitch P2 that is between 500 nm and 1,000 nm, inclusive facilitates diffraction of visible wavelengths in the first light incident on the first component 11, allowing for easier visual perception of the first information formed by the first component 11.

When the first component 11 is a diffraction grating, the depth of the depressions in the diffraction grating is preferably between 50 nm and 600 nm, inclusive. When the depth of the depressions in the diffraction grating is greater than or equal to 50 nm, the diffraction grating effectively diffracts light. A depth of 600 nm or less facilitates formation of the diffraction grating.

The depth of the depressions in the first component 11 is substantially equal to the height of the protrusions 32 in the third component 13, which is the depth of the depressions formed between the protrusions 32. This facilitates simultaneous formation of the first and third components 11 and 13.

Figure 8:
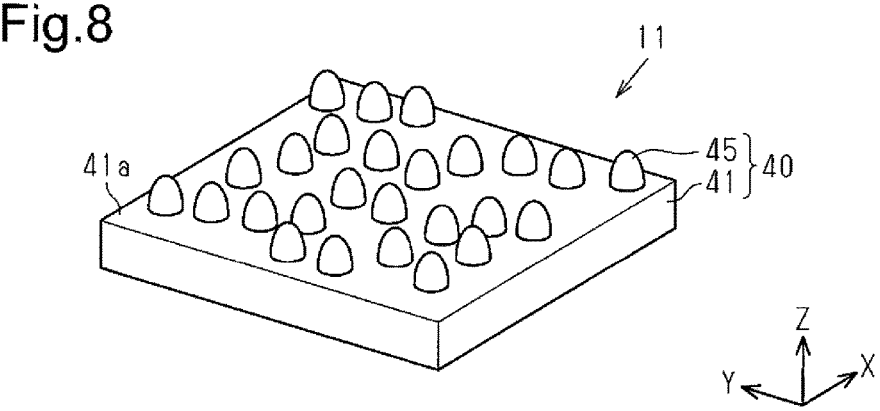
FIG. 8 is a partial perspective view showing a part of the perspective structure of an example of a first component.

As shown in FIG. 8, the first component 11 may be an uneven structure including a plate portion 41 and a plurality of protrusions 45 projecting from the base surface 41a. The protrusions 45 are arranged irregularly on the base surface 41a. In this first component 11, the plate portion 41 and the protrusions 45 form an uneven structure portion 40. Each protrusion 45 may be semielliptical and has a dimension in the Z direction that is greater than the dimension in the X direction. The protrusions 45 have the same shape.

In this first component 11, the surface of each protrusion 45 and the section of the base surface 41a that is free of the protrusions 45 form a part of the front surface 10a of the display body 10. In the first component 11, the surface of each protrusion 45 and the section of the base surface 41a that is free of the protrusions 45 function as a scattering surface, which is an example of the first optical surface, and the first component 11 forms first information, which is displayed on the observation side, by scattering the first light received on the scattering surface.

When the first optical surface of the first component 11 is a light scattering surface, the base surface 41a may include a plurality of depressions arranged irregularly. The depressions may extend from the base surface 41a toward a non-base surface, which is the surface of the plate portion 41 opposite to the base surface 41a. The non-base surface may form a part of the back surface 10b of the display body 10. Alternatively, the non-base surface may be adhered to an additional substrate, and the surface of the additional substrate that is opposite to the non-base surface may serve as the back surface 10b of the display body 10.

In addition, the protrusions 45 on the base surface 41a may differ from one another in shape and the ratio between the dimension in the Z direction and the dimension in the X direction. Further, the depressions in the base surface 41a may be identical in shape, or may differ from one another in the ratio between the dimension in the Z direction and the dimension in the X direction.

Figure 9:
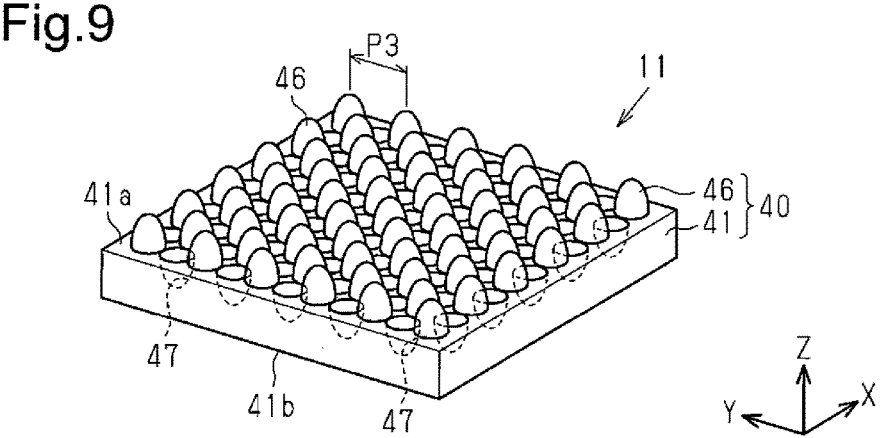
FIG. 9 is a partial perspective view showing a part of the perspective structure of an example of a first component.

As shown in FIG. 9, the first component 11 may be an uneven structure including a plate portion 41 and a plurality of protrusions 46 projecting from the base surface 41a. The plate portion 41 includes a plurality of depressions 47, which extends from the base surface 41a toward a non-base surface 41b. The non-base surface 41b may be a part of the back surface 10b of the display body 10. Alternatively, the non-base surface 41b of the plate portion 41 may be adhered to an additional substrate, and the surface of the additional substrate that is opposite to the non-base surface 41b may serve as the back surface 10b of the display body 10.

In this first component 11, the plate portion 41, the protrusions 46, and the depressions 47 form an uneven structure portion 40. Each protrusion 46 may be semielliptical and have a dimension in the Z direction that is greater than the dimension in the X direction. Each depression 47 is defined by a curved surface.

The protrusions 46 and the depressions 47 of the first component 11 are arranged alternately in both X and Y directions. In the first component 11, the distance between the tops of two protrusions 46 that are adjacent to each other in the X direction is uniform, and the distance between the tops is a pitch P3. The protrusions 46 are arranged at regular intervals in a direction intersecting the X direction, and the depressions 47 are arranged at regular intervals in the direction intersecting the X direction.

In this first component 11, the surface of each protrusion 46, the curved surface defining each depression 47, and the section of the base surface 41a that is free of the protrusions 46 and the depressions 47 form a part of the front surface 10a of the display body 10. In the first component 11, the surfaces of the protrusions 46 and the curved surfaces defining the depressions 47 form the first optical surface.

When the pitch P3 of the first component 11 is greater than or equal to the visible light range, the protrusions 46 arranged at regular intervals and the depressions 47 arranged at regular intervals diffract the light incident on the front surface 10a of the display body 10. The first component 11 thus emits diffraction light in predetermined directions, which differ from the direction of the normal to the plate portion 41, for example. When the pitch P3 is less than the visible light range, the first component 11 absorbs the light incident on the first optical surface. Such absorption by the first component 11 reduces the light reflectivity of the first component 11 as compared with a structure that does not have protrusions or depressions.

When the first light incident on the first optical surface enters the uneven structure portion 40 having the pitch P3 that is less than the visible light range, the refractive indices for visible light vary continuously over the first component 11, typically providing impedance matching at the interface between the uneven structure portion 40 and the air. This reduces reflections of light. The reflectivity of the first light is thus reduced.

In a similar manner as the third component 13, the first component 11 may include a protective layer covering the uneven structure portion 40. The protective layer may be made of a light-transmitting plastic or a dielectric material. Such a first component 11 provides impedance matching at the interface between the uneven structure portion 40 and the protective layer, reducing reflections of light. In addition, a structure in which the display body 10 is adhered to another member using an adhesive resin layer covering the first component 11 still provides impedance matching at the interface between the uneven structure portion 40 and the adhesive layer, thereby reducing reflections of light.

Accordingly, when the first light is incident on the front surface 10a of the display body 10 and the first component 11 is viewed in the direction of the normal to the plate portion 41, the first component 11 displays first information in black or dark gray on the observation side. The first component 11 thus forms the first information using the diffraction light and the absorption of the incident light.

The protrusions 46 and the depressions 47 are arranged alternately in both X and Y directions, forming a square lattice. However, the protrusions 46 and the depressions 47 may be arranged to form a triangle or hexagonal lattice. For a structure that absorbs the first light incident on the first optical surface but does not emit diffraction light, the protrusions 46 and the depressions 47 may be arranged irregularly on the base surface 41a.

The protrusions 46 of the uneven structure portion 40 are semielliptical. Alternatively, the protrusions 46 may have the shape of a rectangular prism or other polygonal prism. Further, the depressions 47 of the uneven structure portion 40 are defined by curved surfaces but may be defined by circular or polygonal surfaces.

In order for the first component 11 to diffract or absorb the first light, the pitch P3 is preferably between 200 nm and 2,000 nm, inclusive, more preferably between 200 nm and 600 nm, inclusive. The pitch P3 that is less than or equal to the visible light region facilitates absorption of the first light by the first component 11. This allows the section of the display body 10 including the first component 11 to have a lower reflectivity than the section surrounding the first component 11, increasing the visibility of the first information formed by the first component 11.

The first components 11 described referring to FIGS. 6, 7 and 9 are uneven structures having protrusions arranged at the predetermined pitch. However, as long as the average value of the pitch P2 and the average value of the pitch P3 are within the respective preferable ranges described above, the minute uneven structures do not have be strictly uniform and may be irregular.

The plate portion 41 shown in FIG. 5 and the uneven structure portions 40 shown in FIGS. 6 to 9 may be made of quartz. However, other inorganic materials that transmit visible light or organic materials that transmit visible light may be used. The inorganic material may be titanium oxide or magnesium fluoride, and the organic material may be acrylic resins including urethane-modified acrylic resin and epoxy-modified acrylic resin, epoxy resins, and other resins. The plate portion 41 shown in FIG. 5, the uneven structure portions 40 shown in FIGS. 6 to 9, and the uneven structure portion 21 of the third component 13 may be made of the same material or different materials.

When the uneven structure portion 40 is made of an inorganic material, the uneven structure portion 40 may be formed by chemically or physically etching a substrate of the inorganic material. When the uneven structure portion 40 is made of a resin, the uneven structure portion 40 may be formed by transferring the shape of an original plate to the resin before hardening. The plate portion 41 shown in FIG. 5 may be the substrate itself, or may be formed by chemically or physically etching the substrate. Alternatively, the plate portion 41 shown in FIG. 5 may be formed simply by applying a resin, or may be formed by transferring the shape of an original plate to the applied resin before hardening.

The first components 11 described referring to FIGS. 6 to 9 may have a metal layer that is entirely or partly formed on the section of the first component 11 that forms the front surface 10a of the display body 10. For example, the first component 11 described referring to FIG. 6 may have a metal layer that at least partially covering the section of the base surface 41a that is free of the protrusions 43, the top surfaces 43a of all protrusions 43, and the side surfaces 43b of all protrusions 43. The first component 11 described referring to FIG. 7 may include a metal layer that at least partially covers the surfaces of the protrusions 44.

The first component 11 described referring to FIG. 8 may have a metal layer that at least partially covers the surfaces of the protrusions 45 and the section of the base surface 41a that is free of the protrusions 45. The first component 11 described referring to FIG. 9 may have a metal layer that at least partially covers the section of the base surface 41a that is free of protrusions 46 and the depressions 47, the surfaces of all protrusions 46, and all surfaces defining the depressions 47. When the first components 11 described referring to FIGS. 6 to 9 each include a metal layer, the surface of the metal layer forms a part of the front surface 10a of the display body 10.

Forming a metal layer increases the light reflectivity of the first optical surface, allowing the first information formed by the first component 11 to be easily perceived by the observer of the display body 10.

In order for the first component 11 to cause reflection, diffraction, scattering, absorption, or interference of light, the thickness of the metal layer of the first component 11 is preferably between 20 nm and 100 nm, inclusive, more preferably between 40 nm and 60 nm, inclusive. The metal layer may be made of aluminum, for example. Further, the metal layer may be made of gold, silver, or titanium nitride.

The metal layer may be formed by physical vapor deposition, such as vacuum deposition or sputtering. When the metal layer is made of the same material as the metal layer 22 of the third component 13, the metal layer 22 of the third component 13 and the metal layer of the first component 11 may be formed simultaneously by physical vapor deposition.

In a similar manner as the first component 11 described referring FIG. 9, the first components 11 described referring to FIGS. 6 to 8 may have a protective layer covering the uneven structure portion 40.

The first component 11 may be an optical component that forms first information using light reflection, an optical component that forms first information using light diffraction, or an optical component that forms first information using scattering of light. Further, the first component 11 may be an optical component that forms first information using light absorption, or an optical component that forms first information using light interference. In addition, the first component 11 may include two or more of such optical components.

The first component 11 forms first information through reflection, diffraction, scattering, absorption, or interference of the first light. Such reflection, diffraction, scattering, absorption, or interference caused by the first component 11 converts the first light into the light having modified intensity, wavelengths, and observation angle. The difference between this light and the light that is created by the optical effect of the other section allows the observer of the display body 10 to recognize the first information. On the other hand, the third display elements 13a display second information using the light having a certain color resulting from the surface plasmon excitation caused by the second light. This facilitates recognizing the difference between the first information and the second information, helping the observer of the display body 10 to correctly recognize multiple pieces of information displayed by the display body 10.

[Front Surface of Display Body]

Figure 10:
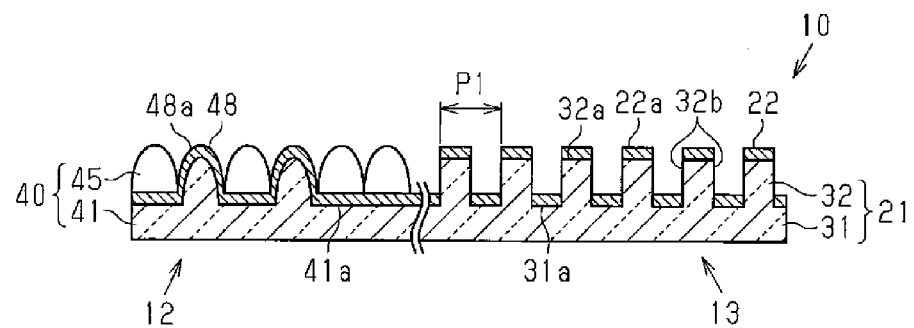
FIG. 10 is a partial cross-sectional view showing a part of the cross-sectional structure of a display body.
Figure 11:
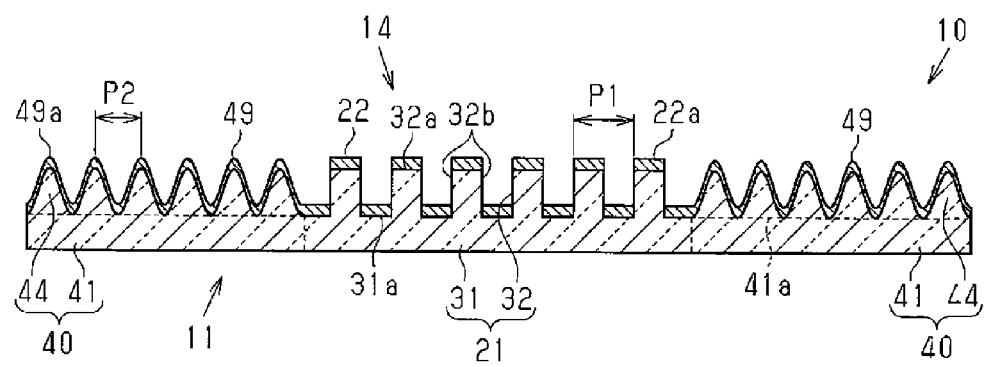
FIG. 11 is a partial cross-sectional view showing a part of the cross-sectional structure of a display body.

Referring to FIGS. 10 and 11, the front surface 10a of the display body 10 is now described. An example of the display body 10 is described below in which the first component 11 is the optical component described referring to FIG. 7, and the second component 12 is the optical component described referring to FIG. 8. FIG. 10 shows a part of the cross-sectional structure of the second component 12 and a part of the cross-sectional structure of the third component 13 in the cross-sectional structure of the display body 10. FIG. 11 shows the cross-sectional structure of a section of the first component 11 that includes a fourth component 14 in the cross-sectional structure of the display body 10.

As shown in FIG. 10, the second component 12 of the display body 10 includes a plate portion 41 and protrusions 45 projecting from the base surface 41a of the plate portion 41. The plate portion 41 and the protrusions 45 form an uneven structure portion 40. The second component 12 also includes a metal layer 48 covering the surfaces of all protrusions 45 and the section of the base surface 41a that is free of the protrusions 45. The front surface 48a of the metal layer 48 forms a part of the front surface 10a of the display body 10 and also forms the first optical surface of the second component 12.

The third component 13 of the display body 10 includes an uneven structure portion 21 and a metal layer 22. The uneven structure portion 21 includes a plate portion 31 and a plurality of protrusions 32, and the metal layer 22 covers top surfaces 32a of the protrusions 32 and the section of a base surface 31a of the plate portion 31 that is free of the protrusions 32. In the third component 13, the front surface 22a of the metal layer 22 and the side surfaces 32b of the protrusions 32 form the front surface 10a of the display body 10. The front surface 22a of the metal layer 22 on the top surface 32a of each protrusion 32 and the front surface 22a of the metal layer 22 on the base surface 31a form the second optical surface that emits second information.

In the display body 10, the uneven structure portion 21 of the third component 13 and the uneven structure portion 40 of the second component 12 are formed by a single substrate. In addition, the metal layer 22 of the third component 13 and the metal layer 48 of the second component 12 are made of the same material.

Since the second component 12 and the third component 13 each include a part of the front surface 10a of the display body 10 as the optical surface, the relative positioning between the second component 12 and the third component 13 may be achieved by positioning the second component 12 in the substrate and positioning the third component 13 in the substrate using a common method. Alternatively, the second and third components 12 and 13 may be formed using the same type of technique.

For example, the shape of an original plate including a die for shaping the second component 12 and a die for shaping the third component 13 may be transferred to a substrate, or a substrate may be etched using a single mask that includes a mask for forming the second component 12 and a mask for forming the third component 13.

Alternatively, the shape of an original plate for forming the second component 12 may be transferred to a substrate, and then the shape of an original plate for forming the third component 13 may be transferred to the substrate, or a substrate may be etched using a mask for forming the second component 12 and then etched using a mask for forming the third component 13.

Such a method increases the accuracy of the position of the third component 13 relative to the second component 12 and thus the accuracy of the display position of the second information relative to the display position of the first information.

When the second component 12 and the third component 13 are formed simultaneously, the number of steps required to manufacture the display body 10 including the second and third components 12 and 13 is the same as the number of steps required to manufacture a display body having only the second component 12. The display body 10 including the second and third components 12 and 13 is manufactured without increasing the number of manufacturing steps or the manufacturing costs.

The display body 10 does not include through-holes extending through the front surface 10a and the back surface 10b of the display body 10 to function as an optical component for displaying information. The display body 10 thus has a higher mechanical strength than a display body having through-holes.

The first component 11 and the third component 13 have similar advantages as the second component 12 and the third component 13.

As shown in FIG. 11, the first component 11 of the display body 10 includes a plate portion 41 and a plurality of protrusions 44 projecting from the base surface 41a of the plate portion 41. The plate portion 41 and the protrusions 44 form an uneven structure portion 40. The first component 11 includes a metal layer 49 covering the surfaces of all protrusions 44. The front surface 49a of the metal layer 49 forms a part of the front surface 10a of the display body 10 and also forms the first optical surface of the first component 11.

Each fourth component 14 of the display body 10 includes an uneven structure portion 21 and a metal layer 22. The uneven structure portion 21 includes a plate portion 31 and a plurality of protrusions 32, and the metal layer 22 covers the top surfaces 32a of the protrusions 32 and the section of the base surface 31a of the plate portion 31 that is free of the protrusions 32. In the fourth component 14, the front surface 22a of the metal layer 22 and the side surfaces 32b of the protrusions 32 form the front surface 10a of the display body 10. The front surface 22a of the metal layer 22 on the top surface 32a of each protrusion 32 and the front surface 22a of the metal layer 22 on the base surface 31a form the second optical surface that emits second information.

In the display body 10, the uneven structure portion 21 of the fourth component 14 and the uneven structure portion 40 of the first component 11 are formed by a single substrate. In addition, the metal layer 22 of the fourth component 14 and the metal layer 49 of the first component 11 are made of the same material.

The first component 11 and the fourth component 14 in the display body 10 have similar advantages as the second component 12 and the third component 13 described above. The first component 11 surrounds the fourth component 14, which is small enough to be indiscernible to the observer of the display body 10 with the naked eye. Thus, unless the observer of the display body 10 knows that the display body 10 has the fourth component 14, the observer is unlikely to notice the fourth component 14 in the display body 10.

Moreover, the first component 11 forms the first information on the observation side by converting the light incident on the front surface 10a into diffraction light. Such optical effect of the first component 11 helps to keep the observer who does not know the presence of the fourth component 14 in the display body 10 from noticing the fourth component 14 in the display body 10. The structure of the display body 10 increases the difficulty of counterfeiting the display body 10 for a person who attempts to counterfeit, while allowing a person who knows the presence of the fourth component 14 to easily authenticate the display body 10 by checking for the fourth component 14.

[Display Body Observation Method]

Figure 12:
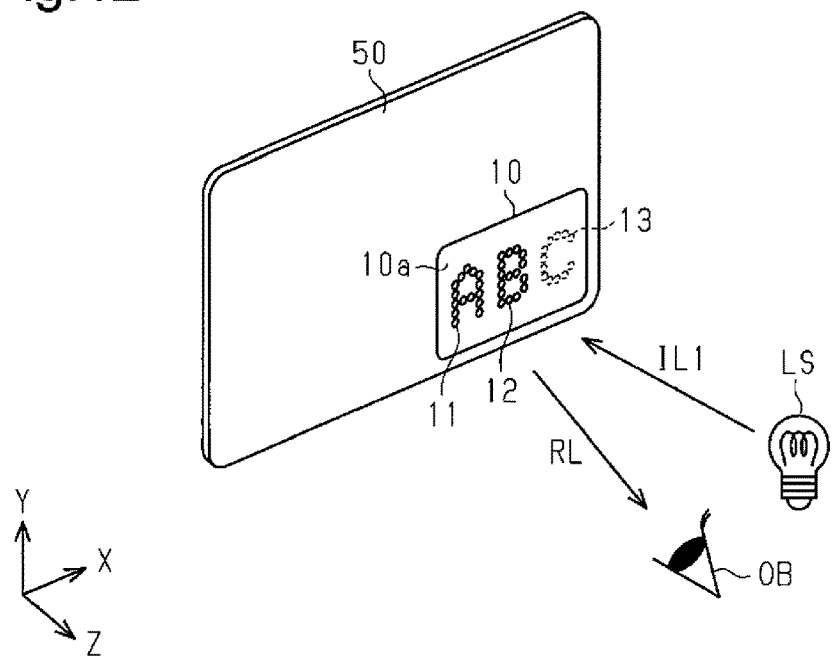
FIG. 12 is a diagram for illustrating the observation method and operation of the display body.
Figure 13:
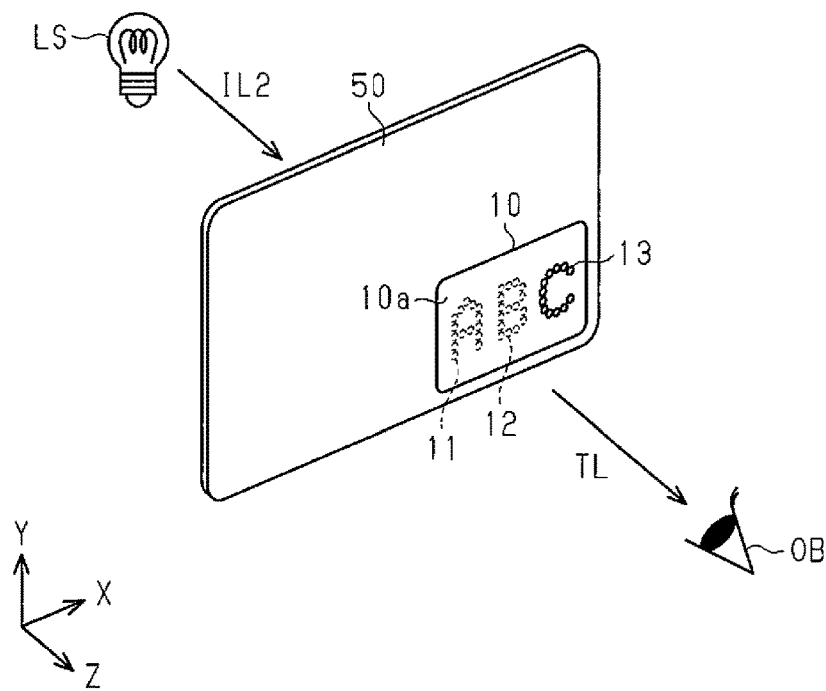
FIG. 13 is a diagram for illustrating the observation method and operation of the display body.
Figure 14:
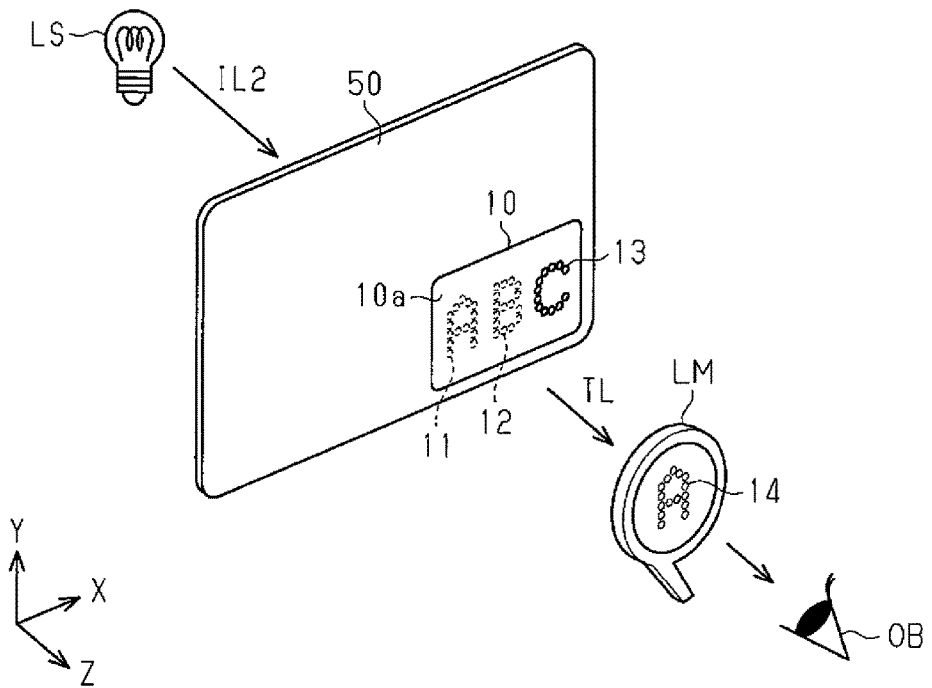
FIG. 14 is a diagram for illustrating the observation method and operation of the display body.

Referring to FIGS. 12 to 14, the method for observing the display body 10 is now described. In the following example, the display body 10 to be observed is attached to a verification subject of which the authenticity requires verification. The first component 11 may be the optical component described referring to FIG. 7, and the second component 12 may be the optical component described referring to FIG. 8.

As shown in FIG. 12, the display body 10 is attached to a verification subject 50. The verification subject 50 may be a substrate through which light passes to the display body 10. Alternatively, a section of the verification subject 50 including at least the section to which the display body 10 is attached may be formed by a substrate that transmits light to the display body 10. Further, the display body 10 may be attached to the verification subject 50 such that light is directly incident on the display body 10.

The method for observing the display body 10 includes a step of causing first light to be incident on the front surface 10a of the display body 10 and a step of observing first information formed by the first optical component from the first light incident on the front surface 10a. The method for observing the display body 10 also includes a step of causing second light to be incident on the back surface 10b of the display body 10 and a step of observing second information formed by the second optical component from the second light incident on the back surface 10b. The step of observing first information and the step of observing second information are performed by an observer. However, these steps may be performed by an apparatus that is capable of detecting the first information and the second information formed by the display body 10.

In the step of causing the first light to be incident, a light source LS located on the observation side emits white light as first light IL1. The first light IL1 is incident on the front surface 10a of the display body 10 from the observation side. The first component 11 of the display body 10 diffracts the first light IL1 incident on the front surface 10a of the display body 10 toward the observation side, thereby emitting diffraction light as reflection light RL. That is, the first component 11 forms first information by diffracting the first light IL1. The second component 12 scatters the first light IL1 incident on the front surface 10a of the display body 10 toward the observation side, thereby emitting scattered light as reflection light RL. That is, the second component 12 forms first information by scattering the first light IL1.

In contrast, the third component 13 does not form predetermined second information on the observation side when the first light IL1 is incident on the front surface 10a of the display body 10.

Consequently, in the step of observing first information, the observer OB visually perceives the first information formed by the first component 11 and the first information formed by the second component 12 but does not perceive the second information of the third component 13.

As shown in FIG. 13, in the step of causing second light to be incident, the light source LS is located on the side opposite to the observation side with respect to the back surface 10b of the display body 10, and second light IL2 is incident on the back surface 10b from the side opposite to the observation side with respect to the back surface 10b. The second light IL2 transmitted through the back surface 10b excites surface plasmons on the third component 13 so that the third component 13 emits transmitted light TL having a predetermined color that differs from the color of the second light IL2. In other words, the third component 13 forms second information by converting the second light IL2 into the transmitted light TL that differs from the second light IL2 in color.

The first component 11 includes the metal layer 48, which forms a part of the front surface 10a of the display body 10, and the second component 12 includes the metal layer 49, which forms a part of the front surface 10a of the display body 10. Thus, the first and second components 11 and 12 do not transmit the second light IL2 incident on the back surface 10b of the display body 10 to the front surface 10a of the display body 10. Alternatively, the first and second components 11 and 12 may transmit part of the second light IL2 but still do not form the predetermined first information.

Consequently, in the step of observing second information, the observer OB visually perceives the second information formed by the third component 13 but does not perceive the first information of the first component 11 or the first information of the second component 12.

As shown in FIG. 14, in the step of observing second information, the display body 10 may be observed under magnification. The observer OB may observe the second information formed by the display body 10 by magnifying the display body 10 using an optical microscope LM. Of the pieces of second information formed by the display body 10, the piece of second information formed by a fourth component 14 may be magnified to the size that is visible by the observer OB. This allows the observer OB to observe the second information formed by the fourth component 14.

The advantages of the embodiments described above are now described.

(1) Since both the first and second optical components include parts of the front surface 10a as optical surfaces, relative positioning between the first optical components and the second optical components can be set by positioning the first components in the substrate and positioning the second optical components in the substrate using a common method. Alternatively, the first and second optical components can be formed using the same type of technique. Such a structure increases the accuracy of the position of the second optical components relative to the first optical components and thus the accuracy of the display position of the second information relative to the display position of the first information.

(2) The size of each fourth component 14 relative to the size of the first component 11 is small enough so that the fourth component 14 is likely to be indiscernible when the reflection light from the front surface 10a of the display body 10 is observed.

(3) Since the third component 13 and the fourth components 14 each form second information having a predetermined color, the difference between the light having the predetermined color and the other section allows the observer OB of the display body 10 to recognize the second information. Thus, the difference between the section of the second information and the other section is easily recognized.

(4) The protrusions of the first optical components and the protrusions of the second optical components form parts of the front surface 10a of the display body 10. Thus, even when the first and second optical components each have a complex structure of protrusions, the display position of the second information relative to the display position of the first information is set with high accuracy.

The embodiments described above may be modified as follows.

[Print Layer]

As will be described below referring to FIGS. 15 to 20, the display body 10 may include a print layer.

Figure 15:
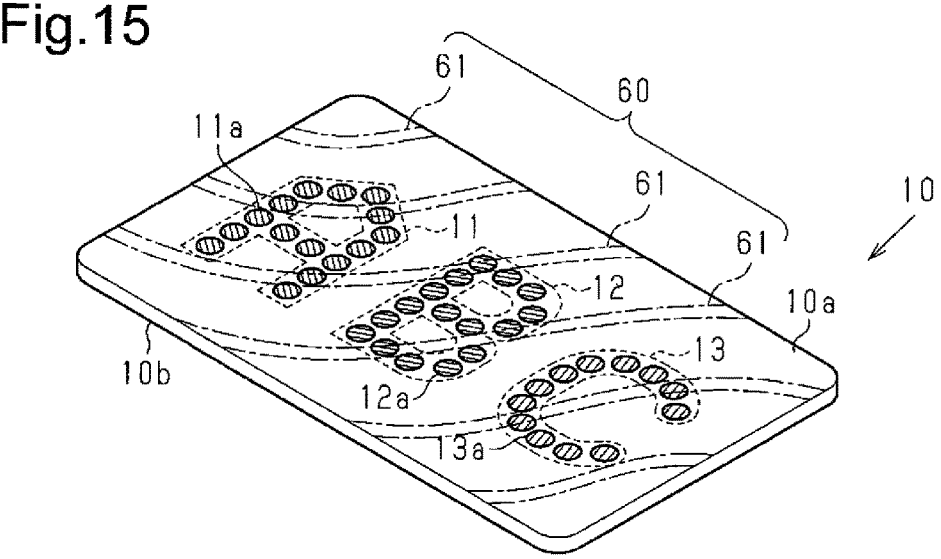
FIG. 15 is a perspective view showing the perspective structure of a display body of a modification.

As shown in FIG. 15, the display body 10 may include a print layer 60, which has a plurality of print portions 61 and forms third information displayed on the observation side of the display body 10. Each print portion 61 is undulated and has at least one curve. In a plan view of the front surface 10a of the display body 10, the print portions 61 are arranged at predetermined intervals in one direction.

In a plan view of the front surface 10a of the display body 10, the print portions 61 include print portions 61 that overlap with first display elements 11a of the first component 11, print portions 61 that overlap with second display elements 12a of the second component 12, and print portions 61 that overlap with third display elements 13a of the third component 13. In a plan view of the front surface 10a of the display body 10, the print portions 61 that overlap with first display elements 11a may include a section that overlaps with a fourth element surrounded by a first display element 11a.

In a plan view of the front surface 10a of the display body 10, the print portions 61 include print portions 61 that do not overlap with any of the first to third components 11 to 13. Alternatively, all of the print portions 61 may overlap with one of the first to third components 11 to 13.

The print layer 60 forms a pattern of undulated shapes, which is an example of a guilloche pattern. Alternatively, the print layer 60 may form a guilloche pattern of arcuate shapes or a guilloche pattern of circular shapes. Further, the print layer 60 may form a guilloche pattern in which two or more of an undulated shape, an arcuate shape, and a circular shape are combined. The print layer 60 may form a pattern of geometric shapes other than undulated, arcuate, or circular shapes. That is, the image displayed by the print layer 60 as third information may be any predetermined pattern.

Figure 16:
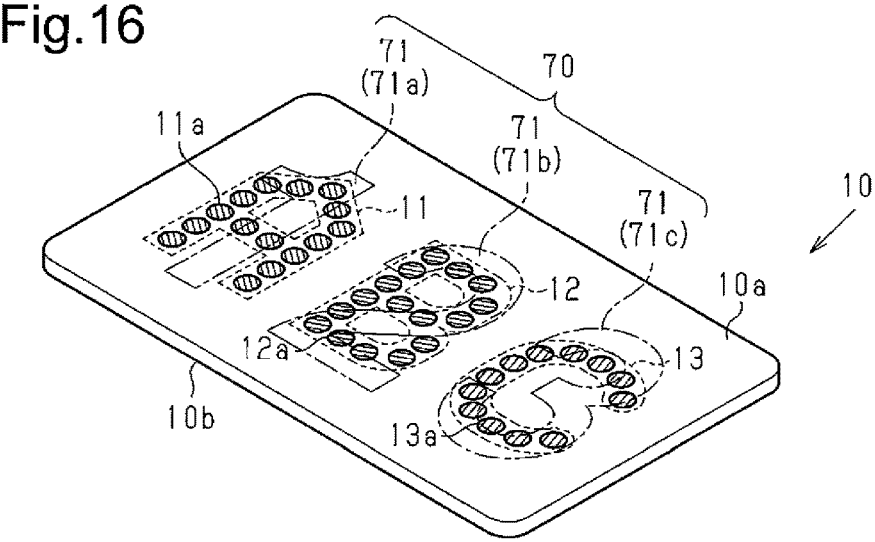
FIG. 16 is a perspective view showing the perspective structure of a display body of a modification.

As shown in FIG. 16, the display body 10 may include a print layer 70 that forms information including at least a letter or a number, instead of the predetermined pattern as described above. Such information may be identification information, such as a card number or a lot number. That is, the print layer 70 displays information as an image that includes at least a predetermined letter or a predetermined number.

The print layer 70 has a plurality of print portions 71 including a first section 71a, a second section 71b, and a third section 71c. In a plan view of the front surface 10a of the display body 10, the print portions 71 are arranged side by side in a predetermined direction in the display body 10. Each print portion 71 may represent one number. Of the print portions 71, the first section 71a represents the number 1, the second section 71b represents the number 2, and the third section 71c represents the number 3.

In a plan view of the front surface 10a of the display body 10, of the three print portions 71, the first section 71a overlaps with first display elements 11a of the first component 11, the second section 71b overlaps with second display elements 12a of the second component 12, and the third section 71c overlaps with third display elements 13a of the third component 13. In a plan view of the front surface 10a of the display body 10, the section of the first section 71a that overlaps with a first display element 11a may overlap with a fourth component inside the first display element 11a.

In a plan view of the front surface 10a of the display body 10, the print portions 71 may include a print portion 71 that does not overlap with any of the first to third components 11 to 13.

The image displayed by the print layer 60 or 70 as third information is not limited to the illustration, letter, or number described above, and may be a graphic, a symbol, and a combination of at least two or more of an illustration, a letter, a number, a graphic, and a symbol.

In the structure described above, the display body 10 includes the print layer, which forms third information, and thus achieves intricate representation of the pieces of information and overlapping between pieces of information.

Referring to FIGS. 17 to 20, the cross-sectional structure of the display body 10 is now described.

The print layer of the display body 10 described referring to FIG. 15 and the print layer of the display body 10 described referring to FIG. 16 display different images but are located at the same position in the thickness direction in the display bodies 10.

Thus, the cross-sectional structure of the display body 10 of FIG. 15 is described below, and the cross-sectional structure of the display body 10 of FIG. 16 is not described. In the following example, the second component 12, which is an example of the first optical component, is the reflective diffraction grating described referring to FIG. 7.

FIGS. 17 to 20 each show a cross-sectional structure in which the back surface 10b of the display body 10 and the observation side of the display body 10 are located on opposite sides of the front surface 10a. In the following description, the effects of the display bodies 10 that are achieved when white light is incident on the display bodies 10 are described.

Figure 17:
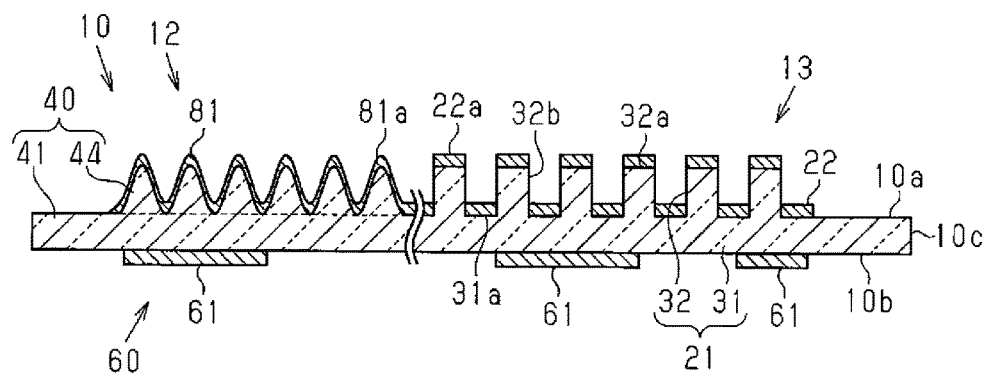
FIG. 17 is a partial cross-sectional view showing a part of the cross-sectional structure of a display body of a modification.

As shown in FIG. 17, the second component 12 of the display body 10 includes an uneven structure portion 40 formed by a plate portion 41 and a plurality of protrusions 44. The second component 12 also includes a metal layer 81 covering the surfaces of all protrusions 44. The front surface 81a of the metal layer 81 forms a part of the front surface 10a of the display body 10 and also forms the first optical surface of the second component 12.

The third component 13 of the display body 10 includes an uneven structure portion 21 and a metal layer 22. The uneven structure portion 21 includes a plate portion 31 and a plurality of protrusions 32, and the metal layer 22 covers the top surfaces 32a of the protrusions 32 and the section of the base surface 31a of the plate portion 31 that is free of the protrusions 32.

In the third component 13, the front surface 22a of the metal layer 22 and the side surfaces 32b of the protrusions 32 form the front surface 10a of the display body 10. The front surface 22a of the metal layer 22 on the top surface 32a of each protrusion 32 and the front surface 22a of the metal layer 22 on the base surface 31a form the second optical surface of the third component 13.

In the display body 10, the uneven structure portion 21 of the third component 13 and the uneven structure portion 40 of the second component 12 are formed by a single substrate 10c. In the uneven structure portion 21 of the third component 13, the surface opposite to the base surface 31a forms a part of the back surface 10b of the display body 10. In the uneven structure portion 40 of the second component 12, the surface opposite to the front surfaces of the protrusions 44 forms a part of the back surface 10b of the display body 10. The metal layer 22 of the third component 13 and the metal layer 81 of the second component 12 are preferably made of the same material but may be made of different materials.

A plurality of print portions 61, which forms a print layer 60, is formed on the back surface 10b of the display body 10. That is, the print layer 60 is located on the side of the back surface 10b of the display body 10 on which the second light is incident. The print portions 61 do not transmit visible light and include print portions 61 that overlap with the second component 12 and print portions 61 that overlap with the third component 13 as viewed in the thickness direction of the display body 10.

The print layer 60 may be made of ink including predetermined pigment or dye and formed using various printing methods, such as gravure printing, offset printing, and screen printing.

In the section of the second component 12 that overlaps with the print portions 61 as viewed in the thickness direction of the display body 10, the print portion 61 limits transmission of the second light from the back surface 10b to the front surface 10a of the display body 10. Accordingly, when the metal layer 81 of the second component 12 transmits light, the section of the second component 12 that overlaps with the print portions 61 and the section of the second component 12 that does not overlap with the print portion 61 provide high contrast in the image perceived by the observer of the display body 10. This facilitates recognizing the information displayed by the print portions 61 in the information displayed by the second component 12.

In the section of the third component 13 that overlaps with print portions 61 as viewed in the thickness direction of the display body 10, the print portions 61 limit transmission of the second light from the back surface 10b to the front surface 10a of the display body 10. Thus, in the sections of the third component 13 that overlap with the print portions 61, a lower amount of light is created by surface plasmon excitation, reducing the likelihood of visual perception of the light from the third component 13. Accordingly, the section of the third component 13 that overlaps with the print portions 61 and the section of the third component 13 that does not overlap with the print portions 61 provide high contrast in the image perceived by the observer of the display body 10. This facilitates recognizing the information displayed by the print portions 61 in the information displayed by the third component 13.

When the observer directly faces the front side of the display body 10, the section that overlaps with the print portions 61 emits the smallest amount of light in the third component 13, facilitating the visual perception of the print portions 61.

Figure 18:
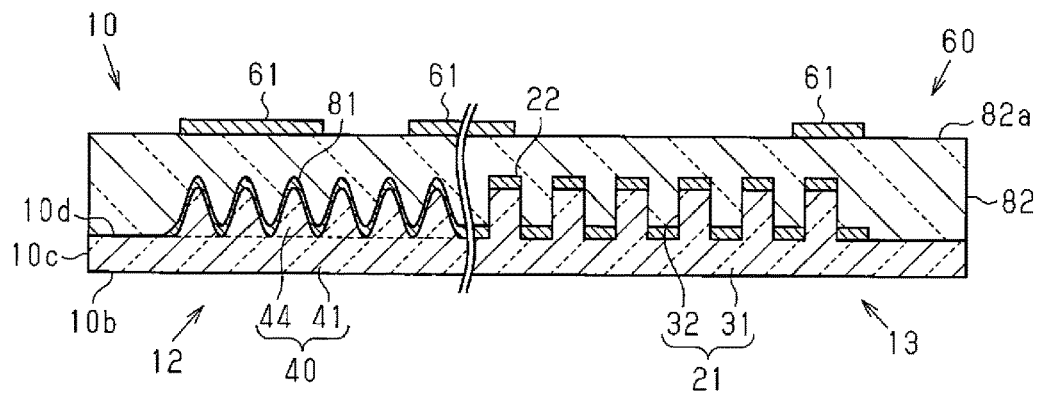
FIG. 18 is a partial cross-sectional view showing a part of the cross-sectional structure of a display body of a modification.

The print layer 60 may be located on the side of the front surface 10a of the display body 10 on which the first light is incident. As shown in FIG. 18, the display body 10 may include a covered surface 10d, which corresponds to the front surface 10a of the display body 10. A transparent plastic layer 82 is formed over the entire covered surface 10d, covering the second component 12 and the third component 13. The transparent plastic layer 82 is made of a plastic capable of transmitting light. The surface of the transparent plastic layer 82 that is opposite to the surface in contact with the covered surface 10d of the display body 10 is a front surface 82a, on which a plurality of print portions 61 are formed.

The transparent plastic layer 82 may have adhesiveness for attaching the display body 10 to an object such as a verification subject. When the transparent plastic layer 82 does not have adhesiveness, another layer having adhesiveness may be formed on the front surface 82a of the transparent plastic layer 82 or the back surface 10b of the display body 10.

The print portions 61 include print portions 61 that overlap with the second component 12 and print portions 61 that overlap with the third component 13 as viewed in the thickness direction of the display body 10.

In the sections of the second component 12 that extend under print portions 61 as viewed in the thickness direction of the display body 10, the print portions 61 limit the first light incident on the second component 12. In the diffraction light emitted by the second component 12, the diffraction light directed toward the print portions 61 is less likely to be emitted to the observation side of the display body 10 due to the print portions 61.

Such a structure reduces the area on the observation side to which the diffraction light is emitted from the second component 12 as compared with a structure that does not include print portions 61 overlapping with the second component 12 as viewed in the thickness direction of the display body 10. This limits visual perception of the diffraction light that is emitted at predetermined angles.

In the section of the third component 13 that overlaps with print portions 61 as viewed in the thickness direction of the display body 10, the print portions 61 reduce the likelihood that the light emitted from the third component 13 by surface plasmon excitation will be emitted to the observation side. This reduces the amount of light emitted from the section of the third component 13 extending under the print portions 61, hindering visual perception of the section extending under the print portions 61.

The print portions of the print layer 60 are not limited to the print portions that do not transmit visible light as described above, and may be print portions that transmit part of visible light.

Figure 19:
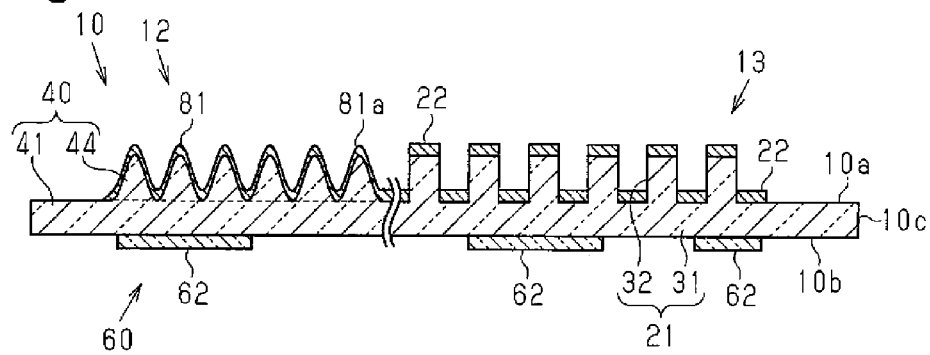
FIG. 19 is a partial cross-sectional view showing a part of the cross-sectional structure of a display body of a modification.

As shown in FIG. 19, in the structure described referring to FIG. 17, the print layer 60 may include a plurality of print portions 62 that transmits part of visible light. The print portions 62 include print portions 62 that overlap with the second component 12 and print portions 62 that overlap with the third component 13 as viewed in the thickness direction of the display body 10.

When the metal layer 81 of the second component 12 transmits light, the sections of the second component 12 that overlap with print portions 62 as viewed in the thickness direction of the display body 10 emit the light that is transmitted through the print portions 62 and has predetermined wavelengths and the diffraction light that is diffracted by the second component 12. Consequently, the light transmitted through the print portions 62 and the diffraction light are visually perceived. This structure allows the pattern of the print portions 62 and the pattern of the diffraction light to be viewed superimposed.

In the section of the third component 13 that overlaps with print portion 62 as viewed in the thickness direction of the display body 10, part of the light transmitted through the print portions 62 is used for plasmon excitation on the third component 13, and the remaining part of the light is transmitted through the third component 13.

When the light transmitted through the print portions 62 differs in color from the light emitted by plasmon excitation on the third component 13, the emitted light has a mixed color of the color of the light transmitted through the print portions 62 and the color of the light transmitted through the third component 13.

Figure 20:
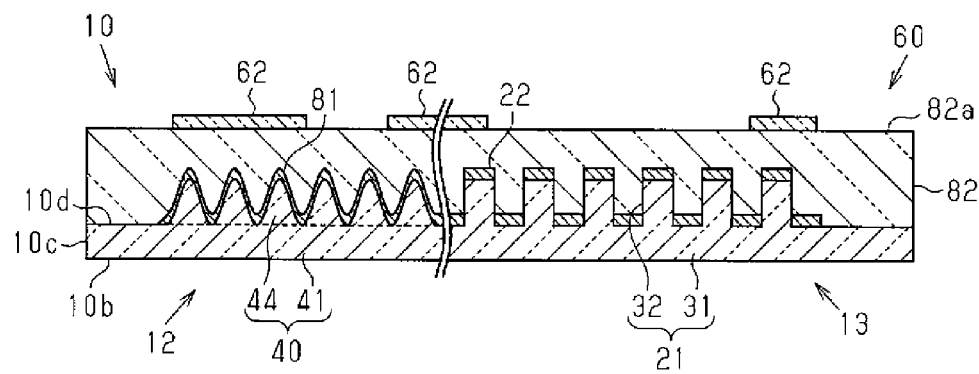
FIG. 20 is a partial cross-sectional view showing a part of the cross-sectional structure of a display body of a modification.

Further, a print layer 60 including print portions 62 that transmit visible light may be used in the structure described referring to FIG. 18. That is, as shown in FIG. 20, a print layer 60 including a plurality of print portions 62 may be formed on the front surface 82a of the transparent plastic layer 82. As viewed in the thickness direction of the display body 10, the print portions 62 include print portions 62 that overlap with the second component 12 and print portions 62 that overlap with the third component 13.

Part of the diffraction light emitted by the second component 12 is directed toward print portions 62. When the diffraction light directed toward the print portions 62 has wavelengths that can pass through the print portions 62, the diffraction light is transmitted through the print portions 62 and emitted to the observation side. In contrast, when the diffraction light directed toward the print portions 62 has wavelengths that cannot pass through the print portions 62, the diffraction light is not emitted to the observation side.

In the sections of the third component 13 that overlaps with print portions 62 as viewed in the thickness direction of the display body 10, part of the incident light is used for surface plasmon excitation, and the remaining part of the light is transmitted through the third component 13.

When the wavelength of the light that can pass through the print portions 62 is the same as the wavelength of the light created by surface plasmon excitation on the third component 13, the light created by surface plasmon excitation is not absorbed by the print portions 62 and transmitted. Thus, the print portions 62 emit light having the same wavelength as the light created by surface plasmon excitation. In contrast, when the wavelength of the light that can pass through the print portions 62 differs from the wavelength of the light created by surface plasmon excitation on the third component 13, the print portions 62 absorb certain wavelengths in the light incident on the third component 13 and transmit the other wavelengths to the observation side.

The display body 10 of FIG. 16 that includes the print layer 70 has similar advantages as the display body 10 that includes the print layer 60.

In a structure in which the display body 10 includes the transparent plastic layer 82, that is, the structure described referring to FIG. 18 and the structure described referring to FIG. 20, print layers may be formed on both of the front surface 82a of the transparent plastic layer 82 and the back surface 10b of the substrate 10c.

For the display body 10 described referring to FIG. 17, the side on the back surface 10b of the display body 10 that is opposite to the front surface 10a may serve as the observation side of the display body 10.

Figure 21:
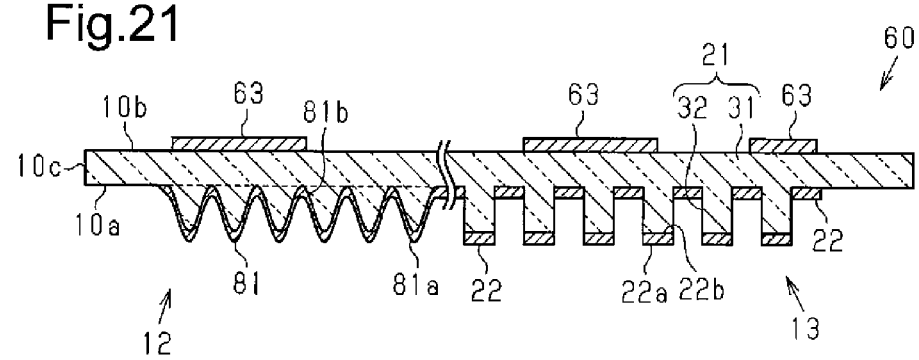
FIG. 21 is a partial cross-sectional view showing a part of the cross-sectional structure of a display body of a modification.

That is, as shown in FIG. 21, the second component 12 may include a metal layer 81 having a back surface 81b, which is in contact with the substrate 10c, and a front surface 81a, which is opposite to the back surface 81b. The back surface 81b of the metal layer 81 forms a part of the first surface on which the first light is incident and also forms the first optical surface of the second component 12.

The third component 13 includes a metal layer 22 having a back surface 22b, which is in contact with the substrate 10c, and a front surface 22a, which is opposite to the back surface 22b. The front surface 22a of the metal layer 22 forms a part of the second surface on which the second light is incident, and the back surface 22b of the metal layer 22 forms the second optical surface of the third component 13.

A plurality of print portions 63, which forms a print layer 60, is formed on the back surface 10b of the display body 10. That is, the print layer 60 is located on the side of the back surface 10b of the display body 10 on which the first light is incident. The print portions 63 do not transmit visible light and include print portions 63 that overlap with the second component 12 and print portions 63 that overlap with the third component 13 as viewed in the thickness direction of the display body 10.

Such a print layer 60 has similar advantages as the print layer 60 of the display body 10 described referring to FIG. 18.

For the display body 10 described referring to FIG. 18, the side on the back surface 10b of the display body 10 that is opposite to the front surface 10a may serve as the observation side of the display body 10.

Figure 22:
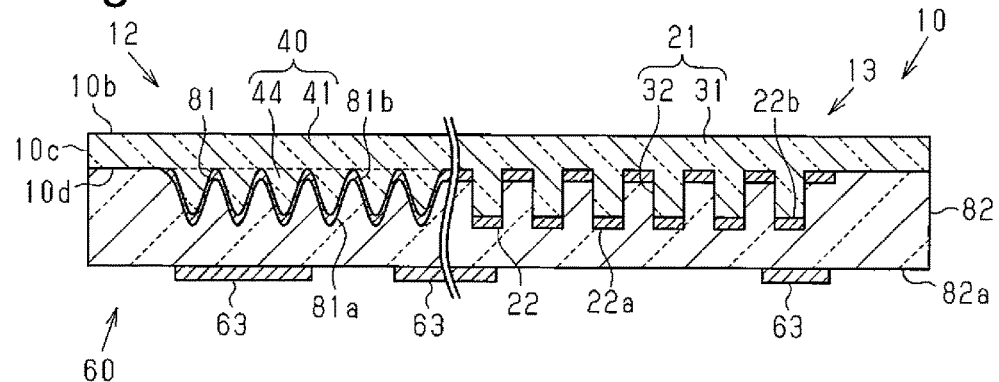
FIG. 22 is a partial cross-sectional view showing a part of the cross-sectional structure of a display body of a modification.

That is, as shown in FIG. 22, the display body 10 may include a transparent plastic layer 82 having a front surface 82a, on which a plurality of print portions 63 of a print layer 60 is formed. In the same manner as the display body 10 described referring to FIG. 21, the back surface 81b of the metal layer 81 of the display body 10 forms a part of the first surface and also forms the first optical surface of the second component 12. The front surface 22a of the metal layer 22 of the display body 10 forms a part of the second surface, and the back surface 22b of the metal layer 22 forms the second optical surface of the third component 13.

Such a print layer 60 has similar advantages as the print layer 60 of the display body 10 described referring to FIG. 17.

In the display body 10 described referring to FIG. 21, the print portions of the print layer 60 may transmit part of visible light.

Figure 23:
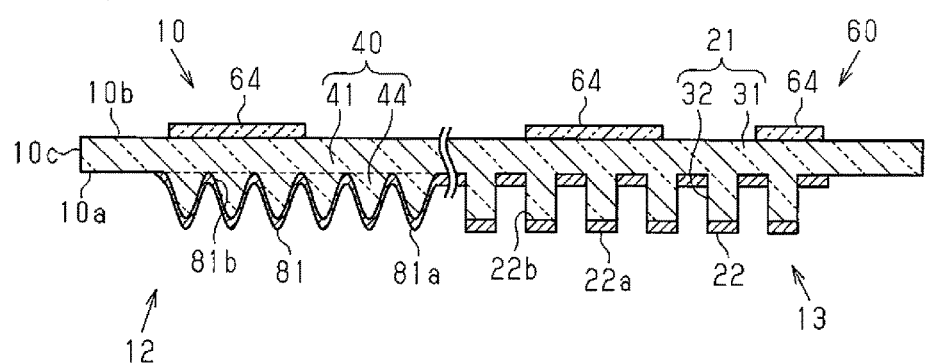
FIG. 23 is a partial cross-sectional view showing a part of the cross-sectional structure of a display body of a modification.

That is, as shown in FIG. 23, the print layer 60 may include a plurality of print portions 64, which transmits part of visible light and is formed on the back surface 10b of the display body 10. The print portions 64 include print portions 64 that overlap with the second component 12 and print portions 64 that overlap with the third component 13 as viewed in the thickness direction of the display body 10.

Such a print layer 60 has similar advantages as the print layer 60 of the display body 10 described referring to FIG. 20.

In the display body 10 described referring to FIG. 22, the print portions of print layer 60 may transmit part of visible light.

Figure 24:
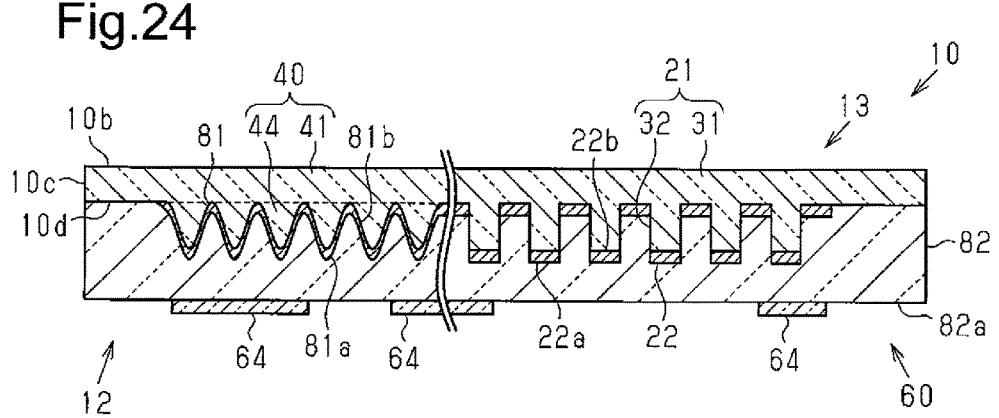
FIG. 24 is a partial cross-sectional view showing a part of the cross-sectional structure of a display body of a modification.

That is, as shown in FIG. 24, the print layer 60 may include a plurality of print portions 64, which transmits part of visible light and is formed on the front surface 82a of the transparent plastic layer 82. As viewed in the thickness direction of the display body 10, the print portions 64 include print portions 64 that overlap with the second component 12 and print portions 64 that overlap with the third component 13.

Such a print layer 60 has similar advantages as the print layer 60 of the display body 10 described referring to FIG. 19.

In each structure having a print layer 60, the second component 12 is not limited to the reflective diffraction grating described above, and may be one of the structures described referring to FIGS. 5, 6, 8 and 9.

The print portions forming one print layer 60 may include print portions that transmit part of visible light and print portions that do not transmit visible light.

Figure 25:
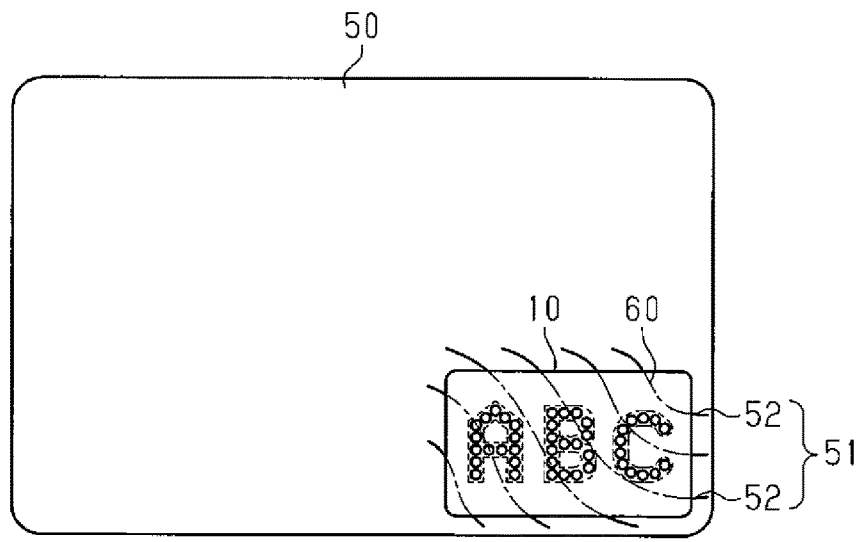
FIG. 25 is a plan view showing the planar structure of a verification subject of a modification.

As shown in FIG. 25, when the display body 10 includes a print layer 60 that displays a pattern of geometric shapes, such as a guilloche pattern described above, a verification subject 50 to which the display body 10 is attached may include a print layer 51. The print layer 51 includes a plurality of print portions 52, and in a plan view of the front surface 10a of the display body 10, each print portion 52 is preferably connected to one of the print portions formed on the display body 10. In this case, the print layer 60 of the display body 10 and the print layer 51 of the verification subject 50 form a common guilloche pattern. Alternatively, the print layer 60 of the display body 10 and the print layer 51 of the verification subject 50 may display a common guilloche pattern without being connected. Further, the print layer 60 of the display body 10 and the print layer 51 of the verification subject 50 may be disconnected and display different guilloche patterns.

[Other Modifications]

In the step of causing the first light to be incident, the light incident on the display body 10 does not have to be white light as long as the light incident on the display body 10 includes light that causes optical effects of the first component 11 and the second component 12.

In the step of causing the second light to be incident, the light incident on the display body 10 does not have to be white light as long as the light incident on the display body 10 includes light of which the color is changeable by the plasmon structures of the third component 13 and the fourth component 14.

As long as the section of the first component 11 that forms the front surface 10a of the display body 10 is capable of forming first information using the first light, the pitch P2 may be a predetermined length that is less than 200 nm, or a predetermined length that is greater than 2,000 nm.

As long as the section of the first component 11 that forms the front surface 10a of the display body 10 is capable of forming first information using the first light, the pitch P3 may be a predetermined length that is less than 200 nm, or a predetermined length that is greater than 2,000 nm.

The first component 11 does not have to include an uneven structure. For example, the first component 11 may consist only of a plate portion having a substantially flat surface that reflects the first light toward the observation side. That is, the first component 11 described referring to FIG. 5 may be a structure that includes only the plate portion 41 and forms first information by reflecting the first light received on the base surface 41a.

The third display elements 13a of the third component 13 may include two types of display elements, first display elements and second display elements. The first display elements differ from the second display elements in the color of transmitted light. The color of transmitted light depends on the state of surface plasmons formed on the plasmon structure in each display element. A change in at least one of the following conditions changes the state of surface plasmons formed on the metal layer 22.

Each first display element includes a first plasmon structure, and each second display element includes a second plasmon structure. The first plasmon structure differs from the second plasmon structure in at least one of the pitch P1 of the protrusions 32 on the base surface 31a of the plate portion 31, the distance D between the base surface 31a and the imaginary plane S, the arrangement of the protrusions 32 on the base surface 31a, the thickness M of the metal layer 22, the refractive index of the transparent plastic layer 82, and the material forming the metal layer 22. The difference causes the state of the surface plasmons excited by the first plasmon structure to differ from the state of the surface plasmons excited by the second plasmon structure.

The third component 13 including the first plasmon structures that emit light having a first color and the second plasmon structures that emit light having a second color has the following advantages.

(5) Since the third component 13 displays a mixed color of the first and second colors, the third component 13 can display a wider variety of colors than a component that includes either the first plasmon structures or the second plasmon structures. In addition, the first display elements differ from the second display elements in the state of surface plasmon excitation, allowing the second optical component to display intricate second information as compared with a structure only including elements that are identical in the state of surface plasmon excitation.

The third display elements 13a of the third component 13 may include three or more types of display elements that differ from one another in the color of transmitted light.

Further, each third display element 13a of the third component 13 may include two or more sections that transmit light of different colors.

The third component 13 and the fourth components 14 may transmit white light. In each of the third component 13 and the fourth components 14, when the protrusions 32 are at random pitches P1 or vary in height, for example, the state of surface plasmons on an interface 23, which is the minimum unit of the plasmon structure, differs from the state on another interface 23. Consequently, the light transmitted through the third component 13 and the fourth components 14 will be white in color.

As compared with protrusions that are arranged regularly, protrusions 32 that are arranged irregularly tend to provide various states of surface plasmon excitation in each of the third component 13 and the fourth component 14. Each of the light transmitted through the third component 13 and the light transmitted through the fourth component 14 tends to be a mixture of multiple light beams of different wavelengths.

As long as surface plasmon excitation occurs on the metal layer 22, the pitch P1 may be a predetermined length that is less than 100 nm, or a predetermined length that is greater than 600 nm.

As long as surface plasmon excitation occurs on the metal layer 22, the thickness of the metal layer 22 may be a predetermined thickness that is less than 20 nm, or a predetermined thickness that is greater than 100 nm.

As long as surface plasmon excitation occurs on the metal layer 22, the distance between the base surface 31a and the imaginary plane S may be a predetermined distance that is less than 30 nm, or a predetermined distance that is greater than 500 nm.

As long as surface plasmon excitation occurs on the metal layer 22, the base surface 31a and the imaginary plane S may form a predetermined angle.

The third component 13 and the fourth components 14 may emit transmitted light to the observation side. The transmitted light has substantially the same wavelengths as the second light that is incident on the back surface 10b of the display body 10, that is, the transmitted light has the same color as the second light. Further, each of the third component 13 and the fourth components 14 may include a section that transmits the second light incident on the back surface 10b of the display body 10, such as a section in which the thickness of the metal layer 22 is small enough to transmit the second light.

The uneven structure of the third component 13 and the fourth components 14 may include a single plasmon structure or two or more plasmon structures.

Figure 26:
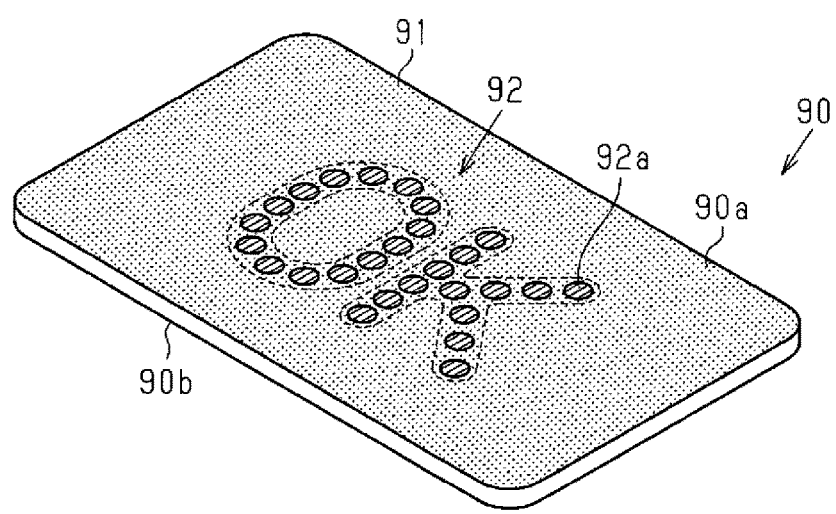
FIG. 26 is a perspective view showing the perspective structure of a display body of a modification.

As shown in FIG. 26, a display body 90 may include a first component 91 and a second component 92, which is entirely surrounded by the first component 91. The second component 92 includes parts of the front surface 90a of the display body 90 as the second optical surface, and the first component 91 includes the other part of the front surface 90a of the display body 90 as the first optical surface.

The first component 91 is the optical component that is described referring to FIG. 9 and forms first information on the observation side by absorbing the first light received on the first optical surface. The first component 91 forms first information that is a black or dark gray section of a rectangular shape excluding the second component 92.

The second component 92 is the optical component described referring to FIGS. 3 and 4 and includes plasmon structures. The second component 92 receives second light transmitted through the back surface 90b of the display body 90, forms second information displayed on the observation side from the second light, and emits the second information from the second optical surface, which is a part of the front surface 90a. The second information is the light transmitted through the back surface 90b of the display body 90 and differs from the second light in color.

In addition, the second component 92 absorbs the first light received on the second optical surface to emit the light that mimics the first information to the observation side. The absorption by the second component 92 results in a reduction in the light reflectivity of the second component 92 as compared with a structure that does not include protrusions or depressions.

Accordingly, when the first light is incident on the front surface 90*a* of the display body 90 and the second component 92 is viewed in the direction of the normal to the plate portion 31, the second component 92 displays third information in black or dark gray on the observation side.

The second component 92 includes a plurality of second display elements 92*a*. When the second light is incident on the display body 90, the second display elements 92*a* form information of a predetermined color as the second information, which is a combination of the letters O and K. When the first light is incident on the display body 90, the second component 92 emits light that has a black or dark gray color and mimics the first information formed by the first component 91.

The reflectivity of the second optical surface of the second component 92 is substantially equal to the reflectivity of the first optical surface of the first component 91. The reflectivities are considered to be substantially equal when the reflectivity of the second optical surface is equal to the reflectivity of the first optical surface and also when the difference between the reflectivity of the second optical surface and the reflectivity of the first optical surface is such that the first information and the light emitted by the second optical component are recognized as a single piece of information when the reflected light from the front surface 90*a* is viewed.

Figure 27:
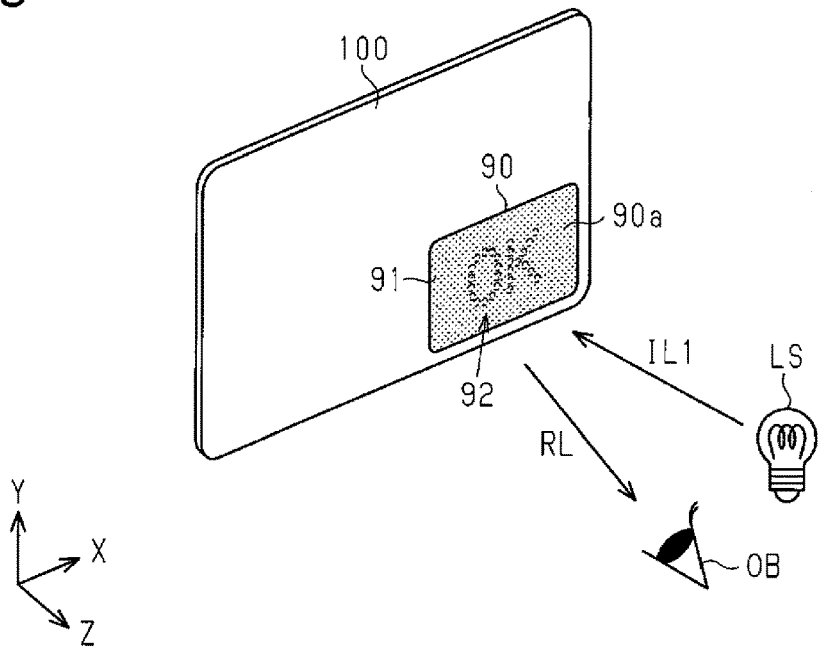
FIG. 27 is a diagram for illustrating the operation of the display body of the modification.

As shown in FIG. 27, the display body 90 is attached to a verification subject 100. The verification subject 100 includes a substrate through which light passes to the display body 90. Alternatively, a section of the verification subject 100 including at least the section to which the display body 90 is attached may be formed by a substrate that transmits light to the display body 90. Further, the display body 90 may be attached to the verification subject 100 such that light is directly incident on the display body 90.

In the step of causing the first light to be incident on the display body 90, a light source LS located on the observation side emits white light as first light IL1. The first light IL1 is incident on the front surface 90*a* of the display body 90 from the observation side. Part of the first light IL1 incident on the front surface 90*a* of the display body 90 is received on the first optical surface and absorbed by the first component 91 of the display body 90. Other part of the first light IL1 incident on the front surface 90*a* of the display body 90 is received on the second optical surface and absorbed by the second component 92.

Consequently, in the step of observing first information, the observer OB visually perceives, in reflection light RL, one piece of information that is formed by the first information displayed by the first component 91 and the light emitted by the second component 92. The light emitted by the second component 92 is indistinguishable by itself to the observer OB. In addition, since the light emitted by the second component 92 mimics the first information formed by the first component 91, the light emitted by the second component 92 is unlikely to hinder the perception of the first information.

Figure 28:
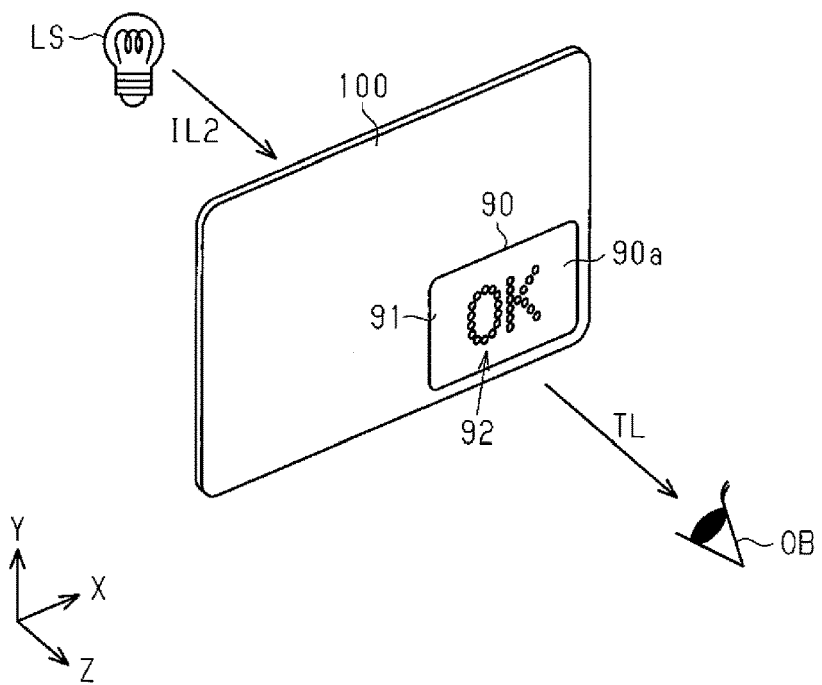
FIG. 28 is a diagram for illustrating the operation of the display body of the modification.

As shown in FIG. 28, in the step of causing the second light to be incident on the display body 90, the light source LS is located on the side opposite to the observation side with respect to the back surface 90*b* of the display body 90, and second light IL2 is incident on the back surface 90*b* of the display body 90 from the side opposite to the observation side with respect to the back surface 90*b*. The second light IL2 transmitted through the back surface 90*b* excites surface plasmons so that the second component 92 emits transmitted light TL that differs from the second light IL2 in color. In other words, the second component 92 forms transmitted light as second information from the second light IL2 and emits the transmitted light to the observation side.

The first component 91 does not display the first information on the observation side when the second light IL2 is incident on the back surface 90*b* of the display body 90.

Consequently, in the step of observing second information, the observer OB visually perceives the second information formed by the second component 92 but does not perceive the first information of the first component 91.

The display body 90 displays a single piece of information formed by the first information and the light emitted by the second component 92 when the first light IL1 is incident, and displays the second information when the second light IL2 is incident. This allows the observer OB to authenticate the verification subject 100 by determining whether the display body 90 has the second information, for example.

The structure described above has the following advantages.

(6) When the second optical surface receives the first light, the second component 92 emits the light that mimics the first information to the observation side. Thus, the light emitted by the second component 92 is unlikely to hinder the perception of the first information.

In each of the embodiments described above, the section of the front surface 10*a* of the display body 10 other than the first component 11, the second component 12, and the third component 13 preferably functions as a fifth component, in a similar manner as the display body 90 described referring to FIG. 26. The fifth component forms first information, and the light emitted by the third component 13 when the third component 13 receives the first light preferably mimics the first information.

The display body 90 may be structured such that, when the first light is incident on the front surface 90*a* of the display body 90, the color of the light emitted by the first component 91 is substantially the same as the color of the light emitted by the second component 92. Such a structure still allows the light emitted by the second component 92 to mimic the first information. The display body 90 may have any structure as long as the color of the diffraction light emitted by the first component 91 is substantially the same as the color of the diffraction light emitted by the second component 92, for example.

The surface of the display body may include the first optical surface, the second optical surface, and a surface other than the first and second optical surfaces, as is the case in the display body 10 of the embodiments. Alternatively, the surface of the display body may include only the first optical surface and the second optical surface, as is the case in the display body 90 of the modification.

When a first optical component surrounds a second optical component in the front surface 10*a* of the display body 10, the relationship between the area S1 and the area S2 may satisfy one of Expressions (2) and (3) below.

$$0.01 > S2/S1 \qquad \text{(Expression 2)}$$

$$S2/S1 > 0.4 \qquad \text{(Expression 3)}$$

A first optical component may surround only a part of a second optical component in the front surface 10*a* of the display body 10.

The display body described above does not have to be a display body that limits counterfeiting of a verification subject by allowing authentication of the verification subject, and may be a display body that is attached to an object for decoration and a display body that is appreciated as an art piece on its own.

The invention claimed is:
1. A display body comprising:
a first surface including a first optical surface and a second optical surface, wherein first light is incident on the first surface from an observation side;
a second surface located opposite to the observation side with respect to the first surface, wherein second light is incident on the second surface from a side opposite to the observation side with respect to the second surface;
a first optical component including the first optical surface, wherein the first optical component forms first information, which is displayed on the observation side, from the first light received on the first optical surface; and
a second optical component including the second optical surface, wherein the second optical component receives the second light transmitted through the second surface, forms second information, which is displayed on the observation side, from the second light, and emits the second information from the second optical surface, wherein
the second optical component is an uneven structure,
the uneven structure includes
an uneven structure portion including a dielectric that transmits light, and
a metal layer covering at least a part of the uneven structure portion,
one of an interface between the uneven structure portion and the metal layer and a surface of the metal layer that is opposite to the interface is the second optical surface,
the uneven structure includes a plasmon structure that receives the second light on the interface and excites surface plasmons on the metal layer so that the second optical surface emits transmitted light that forms the second information and differs from the second light in color,
the uneven structure portion includes a plate portion, which has a base surface serving as one surface, and a plurality of protrusions, which projects from the base surface,
the base surface is substantially parallel with an imaginary plane including top surfaces of the protrusions,
the first optical component surrounds the second optical component in the first surface, S1 represents an area of the first surface that is occupied by the first optical component, S2 represents an area of the first surface that is occupied by the second optical component, the area S1 is between 0.16 mm$^2$ and 1 mm$^2$, inclusive, and the area S2 is between 100 μm$^2$ and 90,000 μm$^2$, inclusive,
the second optical component includes a plurality of display elements defined inside the second optical component, and
each display element is a circular structure in a plan view.
2. The display body according to claim 1, wherein the first surface is described by 0.01≤S2/S1≤0.4.
3. The display body according to claim 1, wherein
the first optical component receives the first light on the first optical surface and emits light in a third color on the observation side, and
the second optical component receives the first light on the second optical surface and emits light in a fourth color, which is the same color as the third color, on the observation side.
4. The display body according to claim 1, wherein
the second optical component includes
a first plasmon structure that emits the transmitted light in a first color, and
a second plasmon structure that emits the transmitted light in a second color that differs from the first color,
wherein the plasmon structure includes the first plasmon structure and the second plasmon structure.
5. The display body according to claim 1, wherein a distance between the base surface and the imaginary plane of the uneven structure portion is between 30 nm and 500 nm, inclusive.
6. The display body according to claim 1, wherein
the metal layer has a thickness of between 20 nm and 100 nm, inclusive, and
the metal layer includes a material of which the real part of the complex dielectric constant is negative in a visible light range.
7. The display body according to claim 1, wherein
the protrusions are arranged in one of a triangular lattice pattern, a square lattice pattern, and a hexagonal lattice pattern on the base surface, and
the protrusions arranged on the base surface have a pitch of between 100 nm and 600 nm, inclusive.
8. The display body according to claim 1, wherein the protrusions are arranged irregularly on the base surface.
9. The display body according to claim 1, wherein
the plurality of display elements of the second optical component includes a first display element and a second display element,
the first display element and the second display element each include a part of the plate portion and at least one of the protrusions, and
the first display element differs from the second display element in at least one of a pitch of the protrusions arranged on the base surface, a distance between the base surface and the imaginary plane, an arrangement state of the protrusions on the base surface, a thickness of the metal layer, and a material forming the metal layer.
10. The display body according to claim 1, wherein
the uneven structure is a second uneven structure,
the base surface is a second base surface,
the plate portion is a second plate portion,
the protrusions are second protrusions,
the first optical component is a first uneven structure, and
the first uneven structure includes:
a first plate portion including a first base surface serving as one surface; and
a plurality of first protrusions projecting from the first base surface.
11. The display body according to claim 10, wherein the first protrusions arranged on the first base surface have an average pitch of between 200 nm and 2000 nm, inclusive.
12. The display body according to claim 10, wherein
surfaces of the first protrusions and a section of the first base surface that is free of the first protrusions form the first optical surface,
the first optical surface is a reflection surface that reflects the first light to the observation side, and
the first protrusions are arranged irregularly on the first base surface.

13. The display body according to claim 1, further comprising a print layer located on at least one of a side of the first surface on which the first light is incident and a side of the second surface on which the second light is incident, wherein the print layer does not transmit at least part of visible light such that the print layer forms third information on the observation side, wherein, in a plan view of the first surface, the print layer overlaps with at least one of a part of the first optical component and a part of the second optical component.

14. A method for observing a display body, wherein the display body includes:

a first surface including a first optical surface and a second optical surface, wherein first light is incident on the first surface from an observation side;

a second surface located opposite to the observation side with respect to the first surface, wherein second light is incident on the second surface from a side opposite to the observation side with respect to the second surface;

a first optical component including the first optical surface, wherein the first optical component forms first information, which is displayed on the observation side, from the first light received on the first optical surface; and a second optical component including the second optical surface, wherein the second optical component receives the second light transmitted through the second surface, forms second information, which is displayed on the observation side, from the second light, and emits the second information from the second optical surface, the second optical component is an uneven structure, the uneven structure includes an uneven structure portion including a dielectric that transmits light, and a metal layer covering at least a part of the uneven structure portion, one of an interface between the uneven structure portion and the metal layer and a surface of the metal layer that is opposite to the interface is the second optical surface, the uneven structure includes a plasmon structure that receives the second light on the interface and excites surface plasmons on the metal layer so that the second optical surface emits transmitted light that forms the second information and differs from the second light in color, the uneven structure portion includes a plate portion, which has a base surface serving as one surface, and a plurality of protrusions, which projects from the base surface, the base surface is substantially parallel with an imaginary plane including top surfaces of the protrusions, the first optical component surrounds the second optical component in the first surface, S1 represents an area of the first surface that is occupied by the first optical component, S2 represents an area of the first surface that is occupied by the second optical component, the area S1 is between 0.16 mm$^2$ and 1 mm$^2$, inclusive, and the area S2 is between 100 μm$^2$ and 90,000 μm$^2$, inclusive, the second optical component includes a plurality of display elements defined inside the second optical component, and each display element is a circular structure in a plan view, the method comprising:

causing the first light to be incident on the first surface;

observing the first information formed by the first optical component from the first light incident on the first surface;

causing the second light to be incident on the second surface; and observing the second information formed by the second optical component from the second light incident on the second surface.

15. The method for observing a display body according to claim 14, wherein the first surface is described as 0.01≤S2/S1≤0.4, and the observing the second information includes observing the second information with the display body magnified.

* * * * *